US012630259B2

(12) United States Patent
Vigen et al.

(10) Patent No.: US 12,630,259 B2
(45) Date of Patent: May 19, 2026

(54) TAILLIGHT HOUSING, SNOW FLAP AND ASSEMBLY THEREOF

(71) Applicant: Arctic Cat Inc., Thief River Falls, MN (US)

(72) Inventors: David Larry Vigen, Thief River Falls, MN (US); Steven Theodore Janzow, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 650 days.

(21) Appl. No.: 17/979,066

(22) Filed: Nov. 2, 2022

(65) Prior Publication Data

US 2023/0257049 A1 Aug. 17, 2023

Related U.S. Application Data

(60) Provisional application No. 63/402,768, filed on Aug. 31, 2022, provisional application No. 63/400,056, filed on Aug. 23, 2022, provisional application No. 63/310,983, filed on Feb. 16, 2022.

(51) Int. Cl.
 *B62J 6/04* (2020.01)
 *B62J 15/04* (2006.01)
 *B62M 27/02* (2006.01)

(52) U.S. Cl.
 CPC ................ *B62M 27/02* (2013.01); *B62J 6/04* (2013.01); *B62J 15/04* (2013.01); *B62M 2027/028* (2013.01)

(58) Field of Classification Search
 CPC .... B62M 27/02; B62M 2027/028; B62J 6/04; B62J 5/04; B62J 15/02; B62J 23/00; B62J 25/08; B62J 41/00
 See application file for complete search history.

(56) References Cited

U.S. PATENT DOCUMENTS

| 745,862 | A | 12/1903 | Kerr |
| 2,987,534 | A | 6/1961 | Hymin et al. |
| 3,529,494 | A | 9/1970 | Matte |
| 3,548,961 | A | 12/1970 | Newman |
| 3,658,358 | A | 4/1972 | Baker |
| 3,688,604 | A | 9/1972 | Schlosser |

(Continued)

FOREIGN PATENT DOCUMENTS

| BR | 112020005350 B1 * | 5/2023 | ............... B62J 6/04 |
| CA | 2456088 A1 | 8/2001 |

(Continued)

OTHER PUBLICATIONS

"Van Amburg (VEI) Polaris Pro Short Rear Bumper Install," Dec. 9, 2014 https://www.snowest.com/forum/threads/van-amburg-vei-polaris-pro-short-rear-bumper-install.386413/.

(Continued)

*Primary Examiner* — Karen Beck
(74) *Attorney, Agent, or Firm* — Billion & Armitage

(57) ABSTRACT

A taillight housing and a snow flap are provided for a snowmobile, wherein the taillight housing is mountable to a bumper/hand bar and a drive track tunnel of a snowmobile such that the taillight housing assembly provides structural reinforcement to the drive track tunnel, and the snow flap is mountable to the bumper/hand bar and optionally mountable to the taillight housing.

19 Claims, 18 Drawing Sheets

(56)                    References Cited

U.S. PATENT DOCUMENTS

| | | | |
|---|---|---|---|
| 3,688,856 | A | 9/1972 | Boehm et al. |
| 3,750,774 | A | 8/1973 | Trapp |
| 3,758,169 | A | 9/1973 | Trapp |
| 3,963,083 | A | 6/1976 | Reese |
| D255,560 | S | 6/1980 | Lapointe |
| 4,502,353 | A | 3/1985 | Beaudoin |
| 4,602,525 | A | 7/1986 | Moroto et al. |
| 4,667,758 | A | 5/1987 | Tamura |
| 4,892,165 | A | 1/1990 | Yasui et al. |
| 4,940,100 | A | 7/1990 | Ueda |
| 4,987,965 | A | 1/1991 | Bourret |
| 5,000,056 | A | 3/1991 | Crawford et al. |
| 5,152,255 | A | 10/1992 | Fukuda |
| 5,232,066 | A | 8/1993 | Schnelker |
| 5,251,718 | A | 10/1993 | Inagawa et al. |
| 5,599,002 | A | 2/1997 | Knutson |
| 5,660,245 | A | 8/1997 | Marier et al. |
| 5,862,662 | A | 1/1999 | Fukuda et al. |
| 5,924,514 | A | 7/1999 | Bullerdick |
| 5,957,230 | A | 9/1999 | Harano et al. |
| 6,073,998 | A | 6/2000 | Siarkowski et al. |
| 6,109,217 | A | 8/2000 | Hedlund et al. |
| D434,711 | S | 12/2000 | Mcquiston |
| 6,161,908 | A | 12/2000 | Takayama et al. |
| D436,336 | S | 1/2001 | Sadr |
| 6,170,589 | B1 | 1/2001 | Kawano et al. |
| 6,224,134 | B1 | 5/2001 | Johnson et al. |
| 6,266,250 | B1 | 7/2001 | Foye |
| 6,270,106 | B1 | 8/2001 | Maki et al. |
| 6,302,232 | B1 | 10/2001 | Forbes |
| 6,336,579 | B1 | 1/2002 | Sako |
| 6,419,533 | B2 | 7/2002 | Lecours |
| 6,446,744 | B2 | 9/2002 | Wubbolts et al. |
| D473,178 | S | 4/2003 | Schumacher |
| 6,561,297 | B2 | 5/2003 | Yatagai et al. |
| 6,561,302 | B2 | 5/2003 | Karpik |
| 6,604,594 | B2 | 8/2003 | Wubbolts et al. |
| 6,644,261 | B2 | 11/2003 | Morii et al. |
| 6,648,408 | B1 | 11/2003 | Grove |
| 6,651,764 | B2 | 11/2003 | Fournier et al. |
| 6,651,765 | B1 | 11/2003 | Weinzierl |
| 6,681,724 | B1 | 1/2004 | Berg |
| 6,695,087 | B2 | 2/2004 | Fournier et al. |
| 6,749,036 | B1 | 6/2004 | Schrapp et al. |
| 6,758,497 | B2 | 7/2004 | Bergman |
| 6,796,607 | B2 | 9/2004 | Bertrand et al. |
| 6,808,034 | B2 * | 10/2004 | Nakano .................. B62M 27/02 |
| | | | 123/65 PE |
| 6,823,957 | B2 | 11/2004 | Girouard et al. |
| 6,823,960 | B2 | 11/2004 | Shimizu et al. |
| 6,860,352 | B2 | 3/2005 | Mallette et al. |
| 6,860,826 | B1 | 3/2005 | Johnson |
| 6,880,658 | B2 | 4/2005 | Fournier et al. |
| 6,890,010 | B2 | 5/2005 | Bergman |
| D506,716 | S | 6/2005 | Hall et al. |
| 6,904,990 | B2 | 6/2005 | Etou |
| 6,923,284 | B2 | 8/2005 | Bédard et al. |
| 6,923,287 | B2 | 8/2005 | Morii |
| 6,926,107 | B2 | 8/2005 | Nishijima |
| 6,941,924 | B2 | 9/2005 | Morii et al. |
| 6,942,050 | B1 | 9/2005 | Honkala et al. |
| 6,942,052 | B1 | 9/2005 | Blakely |
| 6,951,523 | B1 | 10/2005 | Dieter et al. |
| 6,955,237 | B1 | 10/2005 | Przekwas et al. |
| 6,966,395 | B2 | 11/2005 | Schuehmacher et al. |
| 6,976,550 | B2 | 12/2005 | Vaisanen |
| 6,981,564 | B2 | 1/2006 | Bédard et al. |
| 7,011,173 | B2 | 3/2006 | Cadotte et al. |
| 7,025,161 | B2 | 4/2006 | Bertrand et al. |
| 7,032,561 | B2 | 4/2006 | Morii et al. |
| 7,036,619 | B2 | 5/2006 | Yatagai et al. |
| 7,048,293 | B2 | 5/2006 | Bédard |
| 7,063,178 | B2 | 6/2006 | Etou |
| 7,080,704 | B1 | 7/2006 | Kerner et al. |
| 7,083,024 | B2 | 8/2006 | Bergman et al. |
| 7,096,988 | B2 | 8/2006 | Moriyama |
| 7,104,352 | B2 | 9/2006 | Weinzierl et al. |
| 7,104,355 | B2 | 9/2006 | Hoi |
| 7,124,846 | B2 | 10/2006 | Bédard et al. |
| 7,124,847 | B2 | 10/2006 | Girouard et al. |
| 7,124,848 | B2 | 10/2006 | Girouard et al. |
| 7,128,176 | B1 | 10/2006 | Mills et al. |
| 7,140,463 | B2 | 11/2006 | Morii et al. |
| 7,147,074 | B1 | 12/2006 | Berg et al. |
| 7,150,336 | B2 | 12/2006 | Desmarais |
| 7,152,706 | B2 | 12/2006 | Pichler et al. |
| 7,188,693 | B2 | 3/2007 | Girouard et al. |
| 7,198,126 | B2 | 4/2007 | Vaisanen |
| 7,198,127 | B2 | 4/2007 | Yatagai et al. |
| 7,204,355 | B2 | 4/2007 | Akiyama et al. |
| 7,213,668 | B2 | 5/2007 | Richard et al. |
| 7,213,669 | B2 | 5/2007 | Fecteau et al. |
| 7,249,647 | B2 | 7/2007 | Nietlispach |
| 7,255,068 | B2 | 8/2007 | Ashida |
| 7,255,195 | B2 | 8/2007 | Haruna |
| 7,264,075 | B2 | 9/2007 | Schuemacher et al. |
| 7,281,598 | B2 | 10/2007 | Hoi |
| 7,296,645 | B1 | 11/2007 | Kerner et al. |
| 7,296,657 | B2 | 11/2007 | Ohno et al. |
| 7,300,382 | B2 | 11/2007 | Yamamoto |
| 7,303,037 | B2 | 12/2007 | Yatagai et al. |
| 7,328,765 | B2 | 2/2008 | Ebert et al. |
| 7,353,898 | B1 | 4/2008 | Bates, Jr. |
| 7,353,899 | B2 | 4/2008 | Abe et al. |
| 7,353,901 | B2 | 4/2008 | Abe et al. |
| 7,357,207 | B2 | 4/2008 | Vaeisaenen |
| 7,360,618 | B2 | 4/2008 | Hibbert et al. |
| 7,370,724 | B2 | 5/2008 | Saito et al. |
| 7,374,016 | B2 | 5/2008 | Yamaguchi et al. |
| 7,377,348 | B2 | 5/2008 | Girouard et al. |
| 7,389,842 | B2 | 6/2008 | Inoguchi et al. |
| 7,401,674 | B1 | 7/2008 | Berg et al. |
| 7,401,816 | B2 | 7/2008 | Abe et al. |
| 7,409,949 | B1 | 8/2008 | Zauner et al. |
| 7,410,182 | B1 | 8/2008 | Giese |
| 7,413,046 | B2 | 8/2008 | Okada et al. |
| 7,416,249 | B2 | 8/2008 | Atherley |
| 7,451,846 | B2 | 11/2008 | Wubbolts et al. |
| 7,458,593 | B2 | 12/2008 | Saito et al. |
| 7,472,771 | B2 | 1/2009 | Yatagai et al. |
| 7,475,751 | B2 | 1/2009 | Pard et al. |
| 7,484,584 | B1 | 2/2009 | Kerner et al. |
| 7,533,749 | B1 | 5/2009 | Sampson et al. |
| 7,540,511 | B2 | 6/2009 | Saito et al. |
| 7,543,669 | B2 | 6/2009 | Kelahaara |
| 7,543,672 | B2 | 6/2009 | Codere et al. |
| 7,556,114 | B2 | 7/2009 | Hanagan |
| 7,591,332 | B1 | 9/2009 | Bates, Jr. |
| 7,594,557 | B2 | 9/2009 | Polakowski et al. |
| 7,597,069 | B2 | 10/2009 | Ashida |
| 7,610,132 | B2 | 10/2009 | Yanai et al. |
| 7,708,096 | B2 | 5/2010 | Vezina |
| 7,753,154 | B2 | 7/2010 | Maltais |
| 7,775,313 | B1 | 8/2010 | Sampson et al. |
| 7,779,944 | B2 * | 8/2010 | Bergman .................. F01P 3/18 |
| | | | 180/190 |
| 7,779,946 | B2 | 8/2010 | Okada et al. |
| 7,789,184 | B2 | 9/2010 | Maltais |
| 7,798,529 | B2 | 9/2010 | Sato |
| 7,802,644 | B2 | 9/2010 | Brodeur et al. |
| 7,802,645 | B2 | 9/2010 | Mallette et al. |
| 7,802,646 | B2 | 9/2010 | Matsudo |
| 7,806,215 | B2 | 10/2010 | Codere et al. |
| D632,627 | S | 2/2011 | Huang-tsai |
| 7,878,293 | B2 | 2/2011 | Okada et al. |
| 7,913,785 | B2 | 3/2011 | Korsumaki et al. |
| 7,918,299 | B2 | 4/2011 | Yoshihara |
| 7,980,629 | B2 | 7/2011 | Bedard |
| 7,997,372 | B2 | 8/2011 | Maltais |
| 8,001,862 | B2 | 8/2011 | Albulushi et al. |
| 8,028,795 | B2 | 10/2011 | Hisanaga et al. |
| 8,037,961 | B2 | 10/2011 | Fecteau |
| 8,127,877 | B2 | 3/2012 | Fredrickson et al. |
| 8,167,073 | B2 | 5/2012 | Polakowski et al. |

(56) References Cited

U.S. PATENT DOCUMENTS

| | | | |
|---|---|---|---|
| 8,191,665 | B1 | 6/2012 | Sampson et al. |
| 8,225,896 | B2 | 7/2012 | Eichenberger et al. |
| 8,235,164 | B2 | 8/2012 | Okada et al. |
| 8,240,417 | B2 | 8/2012 | Takata |
| D669,025 | S | 10/2012 | Spektor |
| 8,281,889 | B2 | 10/2012 | Inoue |
| D673,890 | S | 1/2013 | Bundy |
| D676,368 | S | 2/2013 | Cover |
| 8,381,857 | B1 | 2/2013 | Sampson et al. |
| 8,408,348 | B2 | 4/2013 | Nakamura et al. |
| 8,430,197 | B2 | 4/2013 | Matsudo |
| 8,453,779 | B2 | 6/2013 | Vezina |
| 8,474,783 | B2 | 7/2013 | Hu |
| 8,490,731 | B2 | 7/2013 | Eaton et al. |
| 8,528,683 | B2 | 9/2013 | Beavis et al. |
| 8,567,546 | B2 | 10/2013 | Berg et al. |
| 8,590,654 | B2 | 11/2013 | Kerner et al. |
| 8,607,912 | B2 | 12/2013 | Mallette et al. |
| 8,657,054 | B2 | 2/2014 | Mallette et al. |
| 8,733,773 | B2 | 5/2014 | Sampson |
| 8,763,745 | B2 | 7/2014 | Nagao et al. |
| 8,881,856 | B2 | 11/2014 | Fecteau et al. |
| 8,919,477 | B2 | 12/2014 | Conn et al. |
| 8,944,204 | B2 | 2/2015 | Ripley et al. |
| 8,994,494 | B2 | 3/2015 | Koenig et al. |
| 9,022,156 | B2 | 5/2015 | Bedard et al. |
| 9,061,732 | B1 | 6/2015 | Vezina |
| 9,073,604 | B2 | 7/2015 | Mallette et al. |
| 9,090,313 | B2 | 7/2015 | Bedard |
| 9,096,289 | B2 | 8/2015 | Hedlund et al. |
| 9,114,852 | B2 | 8/2015 | Fecteau et al. |
| D738,803 | S | 9/2015 | Zhu |
| 9,139,255 | B1 | 9/2015 | Glissmeyer et al. |
| 9,162,731 | B2 | 10/2015 | Maltais |
| 9,228,581 | B2 | 1/2016 | Bernier et al. |
| 9,284,004 | B2 | 3/2016 | Inoue et al. |
| 9,327,789 | B1 | 5/2016 | Vezina et al. |
| 9,346,508 | B1 | 5/2016 | Lemieux |
| 9,346,518 | B2 | 5/2016 | Polakowski et al. |
| 9,352,801 | B2 | 5/2016 | Makitalo et al. |
| 9,352,802 | B2 | 5/2016 | Sampson |
| 9,359,022 | B2 | 6/2016 | Bedard et al. |
| 9,387,907 | B2 | 7/2016 | Nasca et al. |
| 9,428,232 | B2 | 8/2016 | Ripley et al. |
| 9,446,810 | B2 | 9/2016 | Ripley |
| 9,481,370 | B2 | 11/2016 | Bernier et al. |
| 9,540,072 | B2 | 1/2017 | Hedulnd |
| 9,545,844 | B2 | 1/2017 | Forty et al. |
| 9,610,986 | B2 | 4/2017 | Conn |
| 9,618,071 | B2 | 4/2017 | Hirota |
| D789,857 | S | 6/2017 | Hare |
| D789,858 | S | 6/2017 | Hare |
| 9,682,746 | B2 | 6/2017 | Yasuda et al. |
| 9,683,492 | B2 | 6/2017 | Bernier et al. |
| 9,688,354 | B2 | 6/2017 | Nagao et al. |
| 9,694,872 | B2 | 7/2017 | Laroche et al. |
| D794,525 | S | 8/2017 | Chen |
| 9,738,301 | B2 | 8/2017 | Vezina et al. |
| 9,751,552 | B2 | 9/2017 | Mangum et al. |
| 9,751,592 | B2 | 9/2017 | Labbe et al. |
| 9,789,930 | B1 | 10/2017 | Vezina et al. |
| 9,796,437 | B2 | 10/2017 | Wilson et al. |
| 9,809,195 | B2 | 11/2017 | Giese et al. |
| 9,828,064 | B2 | 11/2017 | Pard et al. |
| 9,828,065 | B2 | 11/2017 | Pard |
| 9,845,004 | B2 | 12/2017 | Hedlund et al. |
| D807,804 | S | 1/2018 | Huang |
| 9,873,485 | B2 | 1/2018 | Mangum et al. |
| D809,446 | S | 2/2018 | Montoya et al. |
| D817,838 | S | 5/2018 | Dionisopoulos et al. |
| D818,923 | S | 5/2018 | Baeza |
| D818,924 | S | 5/2018 | Baeza |
| 9,988,067 | B1 | 6/2018 | Mangum et al. |
| 10,001,200 | B2 | 6/2018 | Parraga Gimeno et al. |
| 10,029,567 | B2 | 7/2018 | Lefebvre et al. |
| 10,035,554 | B2 | 7/2018 | Mertens et al. |
| 10,065,708 | B2 | 9/2018 | Labbe et al. |
| D833,940 | S | 11/2018 | Dicanzio |
| 10,144,486 | B2 | 12/2018 | Yasuda et al. |
| D840,309 | S | 2/2019 | Huang |
| 10,195,999 | B1 | 2/2019 | Glickman et al. |
| 10,202,169 | B2 | 2/2019 | Mangum et al. |
| 10,215,083 | B2 | 2/2019 | Vezina et al. |
| D842,791 | S | 3/2019 | Zhu et al. |
| 10,232,910 | B2 | 3/2019 | Mangum et al. |
| 10,259,507 | B1 | 4/2019 | Johnson et al. |
| 10,293,885 | B2 | 5/2019 | Vezina et al. |
| 10,300,989 | B2 | 5/2019 | Vezina |
| 10,300,990 | B2 | 5/2019 | Vezina |
| 10,358,187 | B2 | 7/2019 | Vistad et al. |
| 10,377,446 | B2 | 8/2019 | Thibault et al. |
| 10,392,079 | B2 | 8/2019 | Vezina et al. |
| 10,406,910 | B2 | 9/2019 | Vezina et al. |
| D864,827 | S | 10/2019 | Dicanzio |
| 10,435,059 | B2 | 10/2019 | Mallette et al. |
| 10,450,968 | B2 | 10/2019 | Bernier et al. |
| D867,252 | S | 11/2019 | Lanini et al. |
| D868,661 | S | 12/2019 | Li |
| 10,513,970 | B2 | 12/2019 | Vezina et al. |
| 10,526,045 | B2 | 1/2020 | Vezina et al. |
| 10,538,262 | B2 | 1/2020 | Mangum et al. |
| 10,543,792 | B2 | 1/2020 | Yoshioka et al. |
| 10,556,635 | B2 | 2/2020 | Murayama et al. |
| 10,597,105 | B2 | 3/2020 | Lefebvre et al. |
| 10,604,076 | B2 | 3/2020 | Lanini et al. |
| 10,619,615 | B2 | 4/2020 | Dale et al. |
| 10,675,962 | B2 | 6/2020 | Urabe et al. |
| 10,676,157 | B2 | 6/2020 | Vigen |
| D890,671 | S | 7/2020 | Dicanzio |
| 10,730,576 | B2 | 8/2020 | Labbe et al. |
| 10,766,571 | B2 | 9/2020 | Sampson et al. |
| 10,766,572 | B2 | 9/2020 | Pard et al. |
| 10,766,573 | B2 | 9/2020 | Vezina et al. |
| 10,773,684 | B2 | 9/2020 | Koenig et al. |
| 10,773,774 | B2 | 9/2020 | Mangum et al. |
| 10,780,949 | B2 | 9/2020 | Crain et al. |
| 10,793,226 | B2 | 10/2020 | Crain et al. |
| 10,800,458 | B2 | 10/2020 | Makowski et al. |
| 10,800,490 | B2 | 10/2020 | Foxhall et al. |
| 10,814,935 | B2 | 10/2020 | Vaisanen et al. |
| 10,822,054 | B2 | 11/2020 | Lemieux |
| 10,829,174 | B2 | 11/2020 | Baruzzo |
| 10,843,758 | B2 | 11/2020 | Hebert et al. |
| 10,850,787 | B2 | 12/2020 | Ayala González et al. |
| 10,870,465 | B2 | 12/2020 | Crain et al. |
| 10,875,595 | B2 | 12/2020 | Laberge et al. |
| 10,875,605 | B2 | 12/2020 | Pard |
| 10,899,415 | B2 | 1/2021 | Mangum et al. |
| D909,944 | S | 2/2021 | Mcdowell |
| 10,913,512 | B2 | 2/2021 | Thompson et al. |
| 10,960,914 | B2 | 3/2021 | Mangum et al. |
| D915,974 | S | 4/2021 | Mcdowell |
| 10,974,790 | B2 | 4/2021 | Hosaluk et al. |
| 11,027,794 | B2 | 6/2021 | Vigen |
| 11,097,793 | B2 | 8/2021 | Marchildon et al. |
| 11,110,994 | B2 | 9/2021 | Hedlund et al. |
| D933,560 | S | 10/2021 | Williams |
| 11,142,286 | B2 | 10/2021 | Sampson et al. |
| 11,208,168 | B2 | 12/2021 | Hedlund et al. |
| 11,214,320 | B2 | 1/2022 | Bates et al. |
| 11,220,310 | B2 | 1/2022 | Pard et al. |
| 11,225,302 | B2 | 1/2022 | Vigen |
| 11,230,351 | B2 | 1/2022 | Vezina |
| 11,235,634 | B2 | 2/2022 | Lavallee et al. |
| D944,702 | S | 3/2022 | Li |
| 2001/0027886 | A1* | 10/2001 | Ishii ................. B62M 27/02 180/190 |
| 2001/0047900 | A1 | 12/2001 | Fecteau et al. |
| 2002/0027028 | A1 | 3/2002 | Girouard et al. |
| 2003/0127265 | A1 | 7/2003 | Watson et al. |
| 2003/0151278 | A1 | 8/2003 | Bertrand et al. |
| 2003/0201637 | A1 | 10/2003 | Bergman |
| 2004/0012233 | A1 | 1/2004 | Branscomb |
| 2004/0090119 | A1 | 5/2004 | Ebert et al. |

(56)  References Cited

U.S. PATENT DOCUMENTS

| | | | |
|---|---|---|---|
| 2005/0016784 A1 | 1/2005 | Fecteau | |
| 2005/0040707 A1* | 2/2005 | Ebert | B62M 27/02 |
| | | | 305/185 |
| 2005/0121876 A1 | 6/2005 | Gaudreau et al. | |
| 2005/0241867 A1 | 11/2005 | Abe et al. | |
| 2006/0162977 A1 | 7/2006 | Etou | |
| 2007/0193715 A1* | 8/2007 | Bergman | B60K 11/04 |
| | | | 165/41 |
| 2007/0230198 A1* | 10/2007 | Ohzono | B60Q 1/50 |
| | | | 362/459 |
| 2008/0277184 A1 | 11/2008 | Marleau | |
| 2009/0206626 A1 | 8/2009 | Bedard | |
| 2011/0132679 A1 | 6/2011 | Kerner | |
| 2011/0168477 A1 | 7/2011 | Yokomori et al. | |
| 2012/0205902 A1 | 8/2012 | Beavis et al. | |
| 2013/0032418 A1 | 2/2013 | Ripley et al. | |
| 2013/0080007 A1 | 3/2013 | Monfette et al. | |
| 2013/0175106 A1 | 7/2013 | Bédard et al. | |
| 2013/0206494 A1 | 8/2013 | Hedlund et al. | |
| 2014/0332293 A1 | 11/2014 | Conn | |
| 2015/0021898 A1 | 1/2015 | Serbinski | |
| 2016/0068227 A1 | 3/2016 | Yasuda et al. | |
| 2016/0152304 A1 | 6/2016 | Vezina et al. | |
| 2017/0036604 A1 | 2/2017 | Campbell et al. | |
| 2017/0101142 A1 | 4/2017 | Hedlund et al. | |
| 2018/0141616 A1 | 5/2018 | Pard et al. | |
| 2018/0334211 A1 | 11/2018 | Mertens et al. | |
| 2019/0233055 A1 | 8/2019 | Vezina | |
| 2019/0256170 A1 | 8/2019 | Labbe | |
| 2019/0344657 A1 | 11/2019 | Vezina et al. | |
| 2019/0344859 A1 | 11/2019 | Vistad et al. | |
| 2020/0086940 A1 | 3/2020 | Sturgeon et al. | |
| 2020/0148056 A1 | 5/2020 | Forty et al. | |
| 2020/0224628 A1 | 7/2020 | Dale et al. | |
| 2020/0398785 A1 | 12/2020 | Koenig et al. | |
| 2021/0039558 A1 | 2/2021 | Rucker et al. | |
| 2021/0053652 A1 | 2/2021 | Fuchs et al. | |
| 2021/0053653 A1 | 2/2021 | Mangum et al. | |
| 2021/0086840 A1 | 3/2021 | Glickman et al. | |
| 2021/0114525 A1 | 4/2021 | Mazzarella | |
| 2021/0115835 A1 | 4/2021 | Diehl et al. | |
| 2021/0122445 A1 | 4/2021 | Thompson et al. | |
| 2021/0129943 A1 | 5/2021 | Mangum et al. | |
| 2021/0163086 A1 | 6/2021 | Mallette et al. | |
| 2021/0188182 A1 | 6/2021 | Edwards et al. | |
| 2021/0188185 A1 | 6/2021 | Hedlund et al. | |
| 2021/0188376 A1 | 6/2021 | Laugen et al. | |
| 2021/0188382 A1 | 6/2021 | Hedlund | |
| 2021/0213899 A1 | 7/2021 | Yotsuyanagi et al. | |
| 2021/0214044 A1 | 7/2021 | Krings et al. | |
| 2021/0229731 A1 | 7/2021 | Stoxen et al. | |
| 2021/0237652 A1 | 8/2021 | Mazzarella | |
| 2021/0245837 A1 | 8/2021 | Vigen | |
| 2021/0323629 A1 | 10/2021 | Blackburn et al. | |
| 2021/0347432 A1 | 11/2021 | Halvorson | |
| 2021/0362807 A1 | 11/2021 | Hedlund et al. | |
| 2022/0009419 A1 | 1/2022 | Kim et al. | |
| 2022/0024541 A1 | 1/2022 | Korsumaki | |
| 2022/0097801 A1 | 3/2022 | Vigen | |
| 2022/0111929 A1 | 4/2022 | Matsushita | |
| 2022/0119049 A1 | 4/2022 | Bates et al. | |
| 2022/0132679 A1 | 4/2022 | Han | |
| 2022/0144182 A1 | 5/2022 | Hedlund et al. | |
| 2022/0177077 A1 | 6/2022 | Vistad et al. | |
| 2022/0212754 A1 | 7/2022 | Stock et al. | |
| 2022/0340233 A1 | 10/2022 | Edwards et al. | |
| 2022/0349339 A1 | 11/2022 | Schuehmacher et al. | |
| 2023/0257049 A1* | 8/2023 | Vigen | B62M 27/02 |
| | | | 296/1.07 |
| 2023/0257067 A1 | 8/2023 | Langaas et al. | |
| 2025/0256809 A1 | 8/2025 | Christian et al. | |

FOREIGN PATENT DOCUMENTS

| | | | | |
|---|---|---|---|---|
| CA | 2456088 C | 3/2005 | | |
| CA | 2411964 C | 7/2005 | | |
| CA | 2371477 C | 7/2006 | | |
| CA | 2363856 C | 1/2008 | | |
| CA | 2639857 A1 | 6/2009 | | |
| CA | 2877554 A1 | 1/2014 | | |
| CA | 2987534 A1 | 12/2016 | | |
| CA | 2925800 A1 | 10/2017 | | |
| CA | 2925822 A1 | 10/2017 | | |
| CA | 3117886 A1 | 5/2020 | | |
| CA | 2863952 C | 6/2020 | | |
| CA | 3030691 C | 10/2020 | | |
| CA | 3103308 A1 | 6/2021 | | |
| CN | 105422273 A | 3/2016 | | |
| JP | S55125312 A | 9/1980 | | |
| JP | H10217921 A | 8/1998 | | |
| JP | 2005193788 A | 7/2005 | | |
| JP | 4840406 B2 | 10/2011 | | |
| JP | 2019172095 A * | 10/2019 | | B62K 19/28 |
| WO | 8607423 A1 | 12/1986 | | |
| WO | 2009114414 A1 | 9/2009 | | |
| WO | WO-2019064912 A1 * | 4/2019 | | B62J 6/04 |

OTHER PUBLICATIONS

"New Pro Ride/AXYS Snow Flaps now available!", Dec. 20, 2016 and Dec. 21, 2016 https://www.hardcoresledder.com/threads/new-pro-ride-axys-snow-flaps-now-available.1663618/.

"Ski-Doo New OEM Snow Flap Guard Black/Silver REV 520000704" https://leadersrpmshop.com/ (Accessed: Oct. 31, 2002).

"Yamaha SX Viper Mountain—SXV70MH Bumper Diagram" https://www.partzilla.com/catalog/yamaha/snowmobile/2003/sx-viper-mountain-sxv70mh/bumper (Accessed: Apr. 22, 2022).

"Arctic Cat New OEM Tunnel Snow Flap/Guard CF, CFR,M, Sno Pro, M8 M6 CFR8 M1000 CF8" https://www.amazon.ca/Arctic-Tunnel-Snow-Guard-M1000/dp/B01DUY2GCW (Accessed: Apr. 22, 2022).

"2007 Arctic Cat Jaguar Z1 Next Generation Performance 4-Stroke", Snowtech Magazine, retrieved May 26, 2022 from https://www.snowtechmagazine.com/2007-arctic-cat-jaguar-z1-next-generation-performance-4-stroke/, Sep. 20, 2006.

"Arctic Cat Snowmobile Pro Mountain Running Boards", https://www.motorsportsgear.ca/products/arctic-cat-snowmobile-pro-mountain-running-boards?variant=30718958272561, 2 Pages.

"Cooling Assembly Arctic Cat, Snowmobile, 1997 ZR 440 [97ZRA-1997-22-25]", https://www.countrycat.com/arctic-cat-parts?gclid=EAlalQobChMI7O-P-JzGgAMVdqtaBR1Dbg33EAAYASABEgKGPvD_BWE#/Arctic_Cat/1997_ZR_440_%5b97ZRA-1997-22-25%5d/COOLING_ASSEMBLY_%5b65743%5d/97ZRA-1997-22-25/65743/y.

"English Translation of CN 102832746", 2025.

"Front Frame and Footrest Assembly [65748]", https://www.countrycat.com/arctic-cat-parts?gclid=EAlalQobChMI7O-P-JzGgAMVdqtaBR1Dbg33EAAYASABEgKGPvD_BwE#/Arctic_Cat/1997_ZR_440_%5b97ZRA-1997-22-25%5d/FRONT_FRAME_AND_FOOTREST_ASSEMBLY_%5b65748%5d/97ZRA-1997-22-25/65748/y.

"Running Board Support Bracket", https://www.countrycat.com/arctic-cat-parts?gclid=EAlalQobChMI7O-P-JzGgAMVdqtaBR1Dbg33EAAYASABEgKGPvD_BWE#/Arctic_Cat/1992_PANTHER_%5b0650-173-1992-17-02%5d/TUNNEL_AND_REAR_BUMPER_%5b59192%5d/0650-173-1992-17-02/59192/y, 1992 Arctic Cat Panther Photos taken Jul. 26, 2023.

"Tunnel and Rear Bumper [65742]—1997 ZR 440 [97ZRA-1997-22-25]", https://www.countrycat.com/arctic-cat-parts?gclid=EAlalQobChMI7O-P-JzGgAMVdqtaBR1Dbg33EAAYASABEgKGPvD_BWE#/Arctic_Cat/1997_ZR_440_%5b97ZRA-1997-22-25%5d/TUNNEL_AND_REAR_BUMPER_%5b65742%5d/97ZRA-1997-22-25/65742/y.

Watson, Captain Jamesr. , "Fiber-Reinforced Composites", article dated 'Spring' 1997, accessed Jul. 25, 2025 at: https://www.

(56) References Cited

OTHER PUBLICATIONS epoxyworks.com/fiber-reinforced-composites/ (Year: 1997), 1997,
8 Pages.

* cited by examiner

TAILLIGHT HOUSING, SNOW FLAP AND ASSEMBLY THEREOF

CROSS-REFERENCE TO RELATED APPLICATIONS

This application claims the benefit of U.S. Provisional Application No. 63/400,056, filed on Aug. 23, 2022, U.S. Provisional Application No. 63/402,768, filed on Aug. 31, 2022, and to U.S. Provisional Application No. 63/310,983, filed on Feb. 16, 2022. The disclosures of the above applications are incorporated herein by reference in their entirety.

FIELD

The present teachings relate to snowmobiles, and more particularly to a taillight housing and/or snow flap for a snowmobile

BACKGROUND

The statements in this section merely provide background information related to the present disclosure and may not constitute prior art.

Conventional snowmobiles typically include aluminum track tunnels that cover and box-in the drive track and protect the rider from snow. Additionally, in many instance the tunnels help to direct snow from the drive track toward an engine heat exchanger, or radiator mounted to the underside of the tunnel. Most known snowmobile track tunnels are thin to reduce weight. As a result, the end of the tunnel generally needs to be reinforced by various support structures to improve stability of the tunnel and allow for the attachment of components such as taillights and flaps. These support structures add weight, complexity and costs to the structure of the track tunnels of known snowmobiles.

SUMMARY

In various embodiments, the present disclosure provides a snowmobile taillight housing that eliminates a bracket and other structure of known snowmobiles that is/are welded or otherwise connected at an underside and/or and end of know snowmobile track tunnels to provide structural support to the tunnel and/or mounting surfaces for various snowmobile components such as the taillight, snow flap and the rear grab bar or bumper. Generally, the taillight housing of the present disclosure eliminates such support/mounting components by being structured and operable to provide a housing for the taillight and also a structural component that provides structural support and stability to the track tunnel.

For example, in various embodiments, the present disclosure provides a taillight and snow flap assembly for a snowmobile, wherein the assembly comprises a taillight housing assembly mountable to a bumper/hand bar and a drive track tunnel of a snowmobile such that the taillight housing assembly provides structural reinforcement to the drive track tunnel. The taillight and snow flap assembly additionally comprises a snow flap mountable to taillight housing assembly.

In various other embodiments, the present disclosure provides a taillight and snow flap assembly for a snowmobile, wherein the assembly comprises a taillight housing assembly mountable to a bumper/hand bar and a drive track tunnel of a snowmobile such that the taillight housing assembly provides structural reinforcement to the drive track tunnel. In various instances the taillight housing assembly comprises a main body that is connectable to the drive track tunnel and a pair of opposing retention wings extending from opposing lateral ends of the main body that are structured and operable to mount to the bumper/hand bar. The taillight and snow flap assembly additionally comprises a snow flap mountable to taillight housing assembly. In various instances the snow flap comprises a pair of opposing retention arms extending from ends of opposing sidewalls of a main body of the snow flap, wherein the retention arms structured and operable to mount to the bumper/hand bar.

In yet other various embodiments, the present disclosure provides a snowmobile that comprises a chassis, a drive track operably connected to the chassis and structured and operable to rotate to propel the snowmobile across snow, a prime mover mounted to the chassis and structured and operable to provide motive power to the drive track, a drive track tunnel connected to the chassis and structured and operable to at least partially house at least a portion of the drive track, a heat exchanger mounted to an underside of the tunnel and structured and operable to cool the prime mover, a bumper/hand bar is mounted to the chassis and to which the drive track tunnel is further mounted, and a taillight and snow flap assembly mounted to the drive track tunnel and to the bumper/hand bar. In various instances, the taillight and snow flap assembly comprises a taillight housing assembly mountable to a bumper/hand bar and a drive track tunnel of a snowmobile such that the taillight housing assembly provides structural reinforcement to the drive track tunnel. The taillight and snow flap assembly additionally comprises a snow flap mountable to taillight housing assembly.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

3

Figure 5:
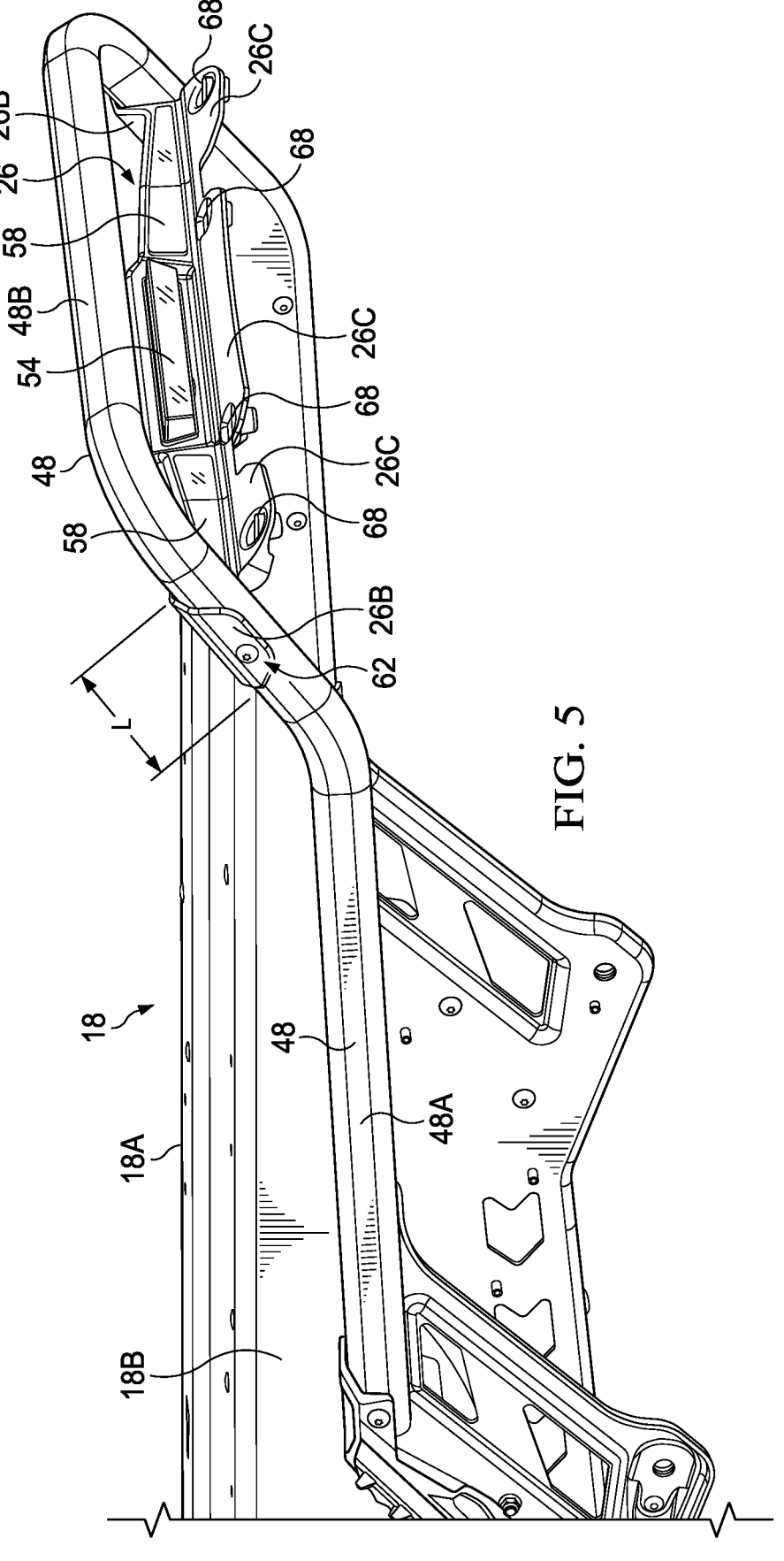
FIG. 5 is an exemplary isometric view of a tunnel and a bumper/hand bar of a snowmobile having the taillight housing fixture shown in FIGS. 3 and 4 mounted to the tunnel and the bumper/hand bar in accordance with various embodiments of the present disclosure.
Figure 6:
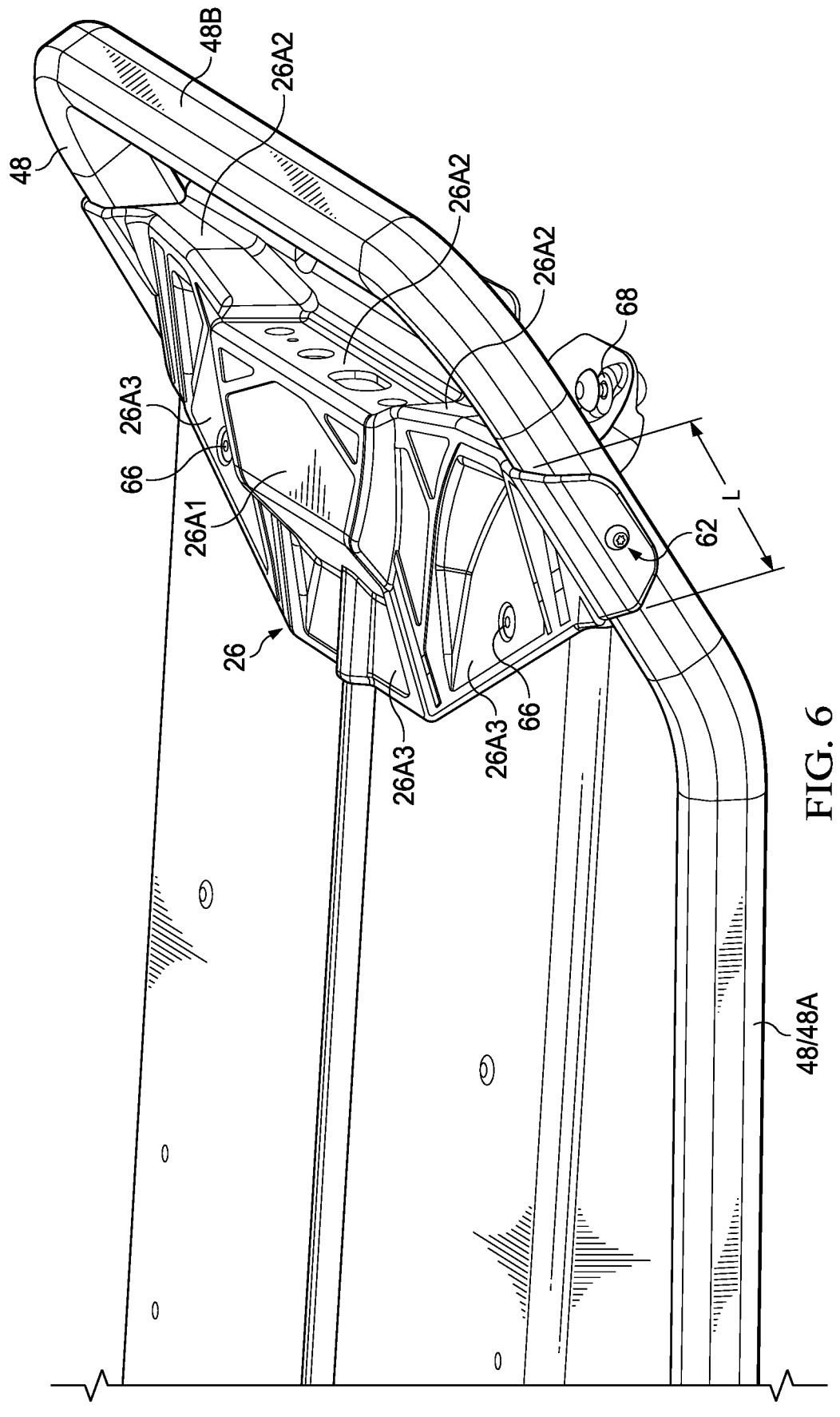

FIG. 6 is an exemplary top isometric view of the taillight housing fixture shown in FIG. 5 mounted to the tunnel and the bumper/hand bar in accordance with various embodiments of the present disclosure.

Figure 7:
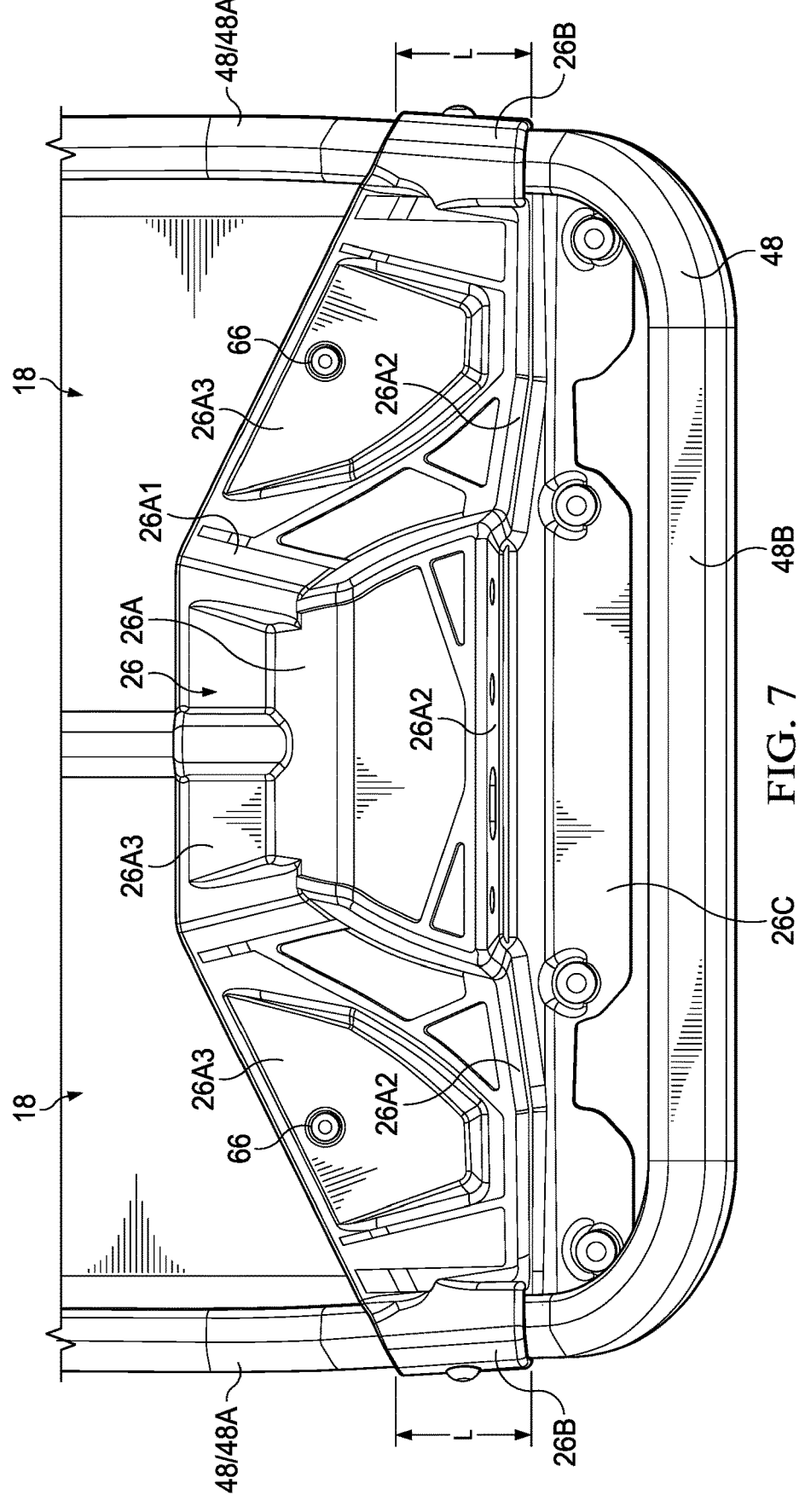

FIG. 7 is an exemplary top view of the taillight housing fixture shown in FIGS. 5 and 6 mounted to the tunnel and the bumper/hand bar in accordance with various embodiments of the present disclosure.

Figure 1:
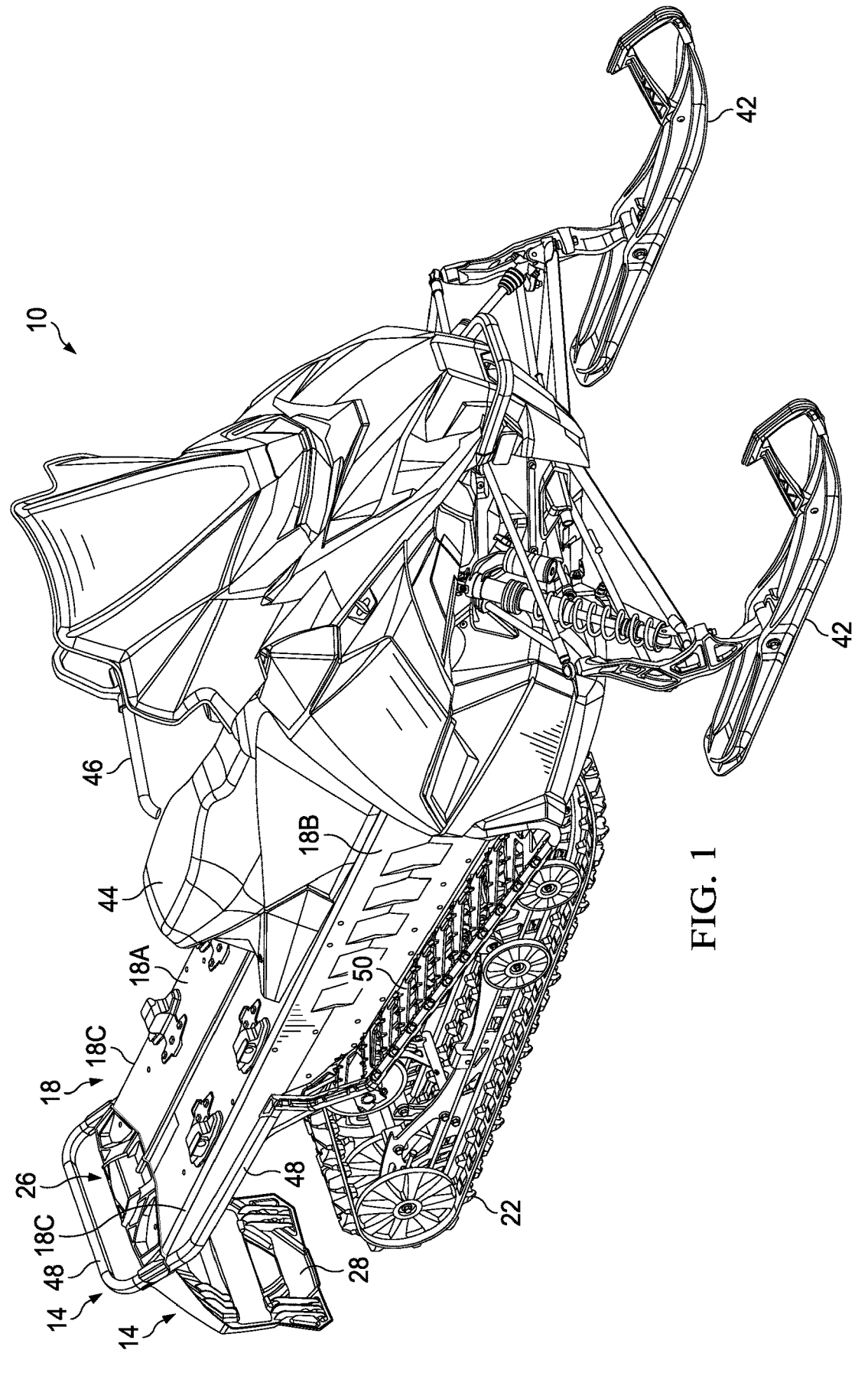
FIG. 1 is an exemplary isometric view of a snowmobile comprising a taillight and snow flap assembly in accordance with various embodiments of the present disclosure.
Figure 2:
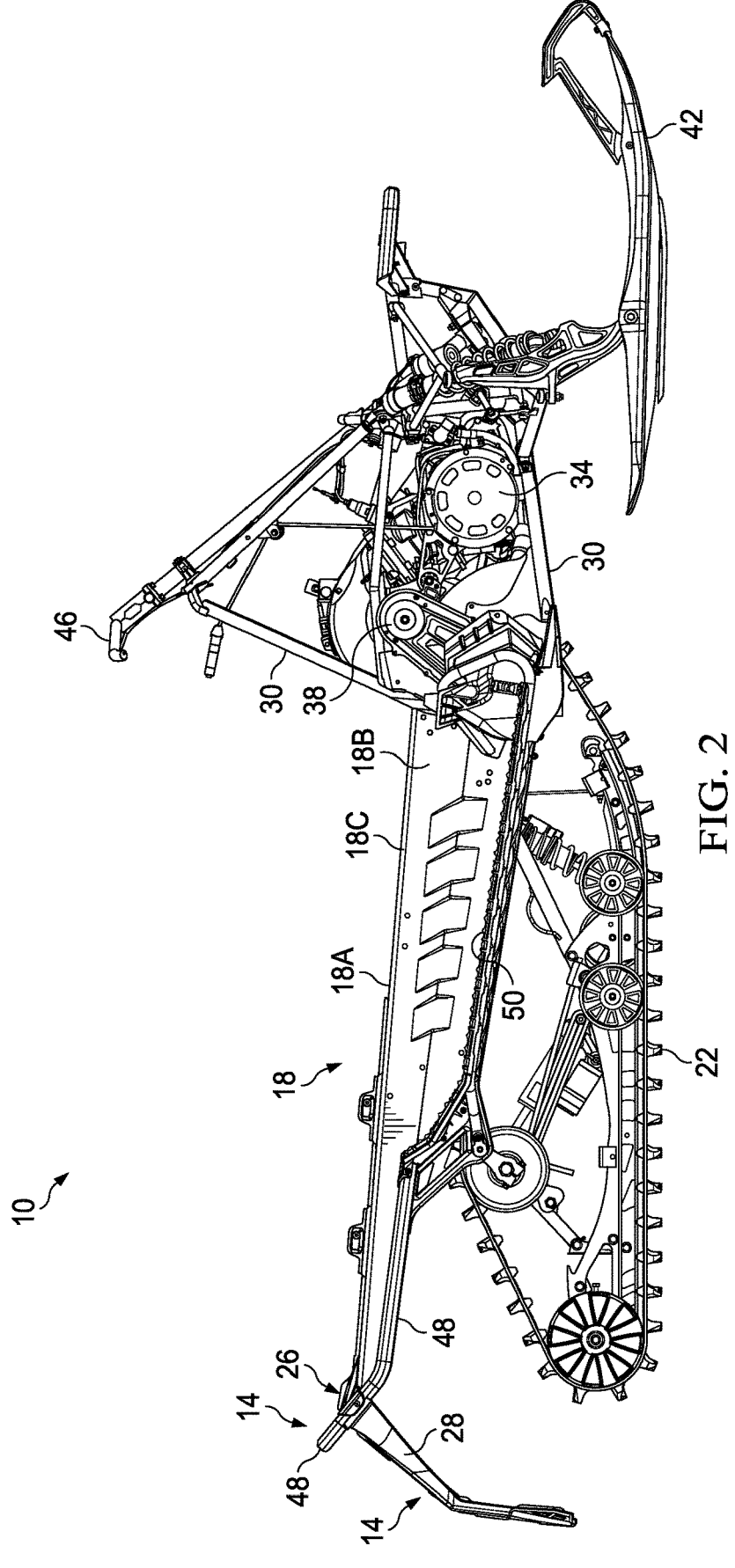
FIG. 2 is an exemplary side view of the snowmobile comprising the taillight and snow flap assembly in accordance with various embodiments of the present disclosure.
Figure 3:
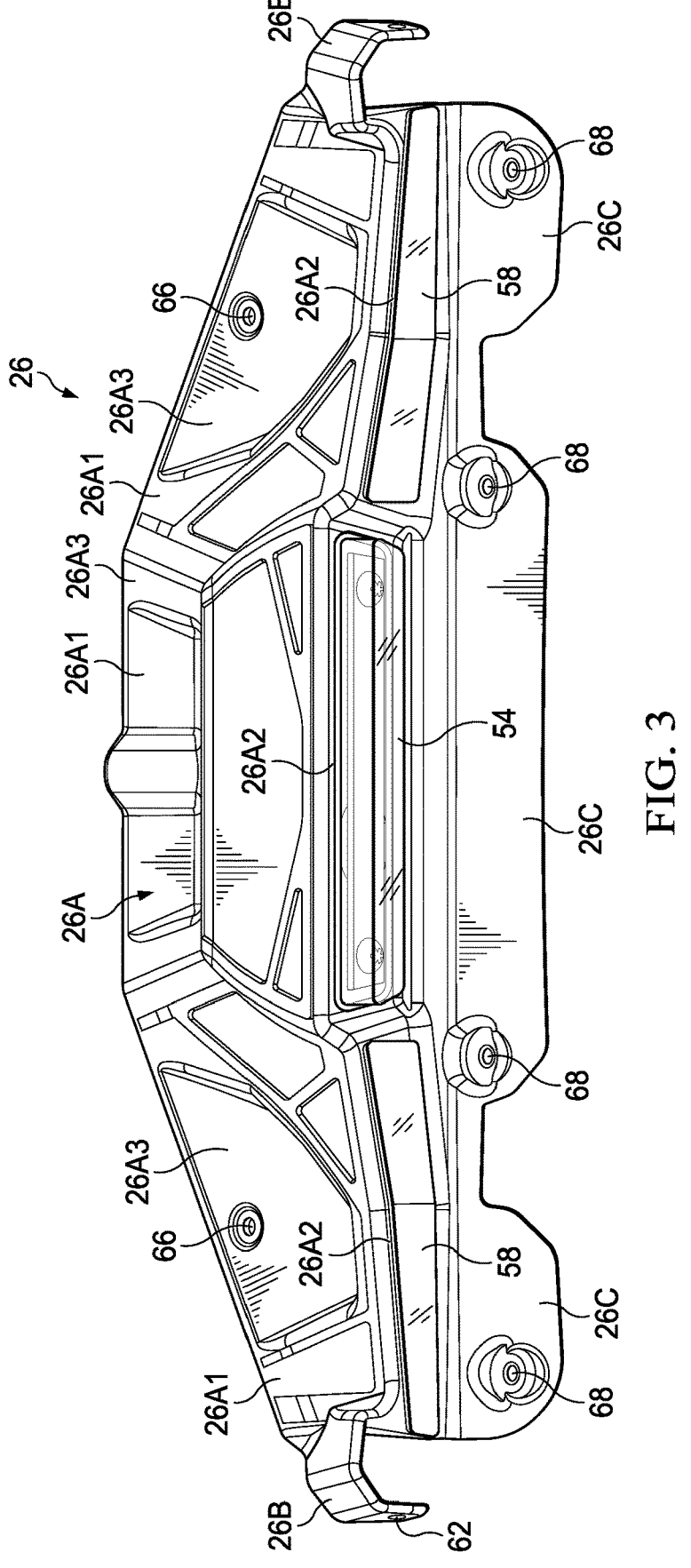
FIG. 3 is an exemplary isometric view of a taillight housing fixture of the taillight and snow flap assembly shown in FIGS. 1 and 2 in accordance with various embodiments of the present disclosure.
Figure 4:
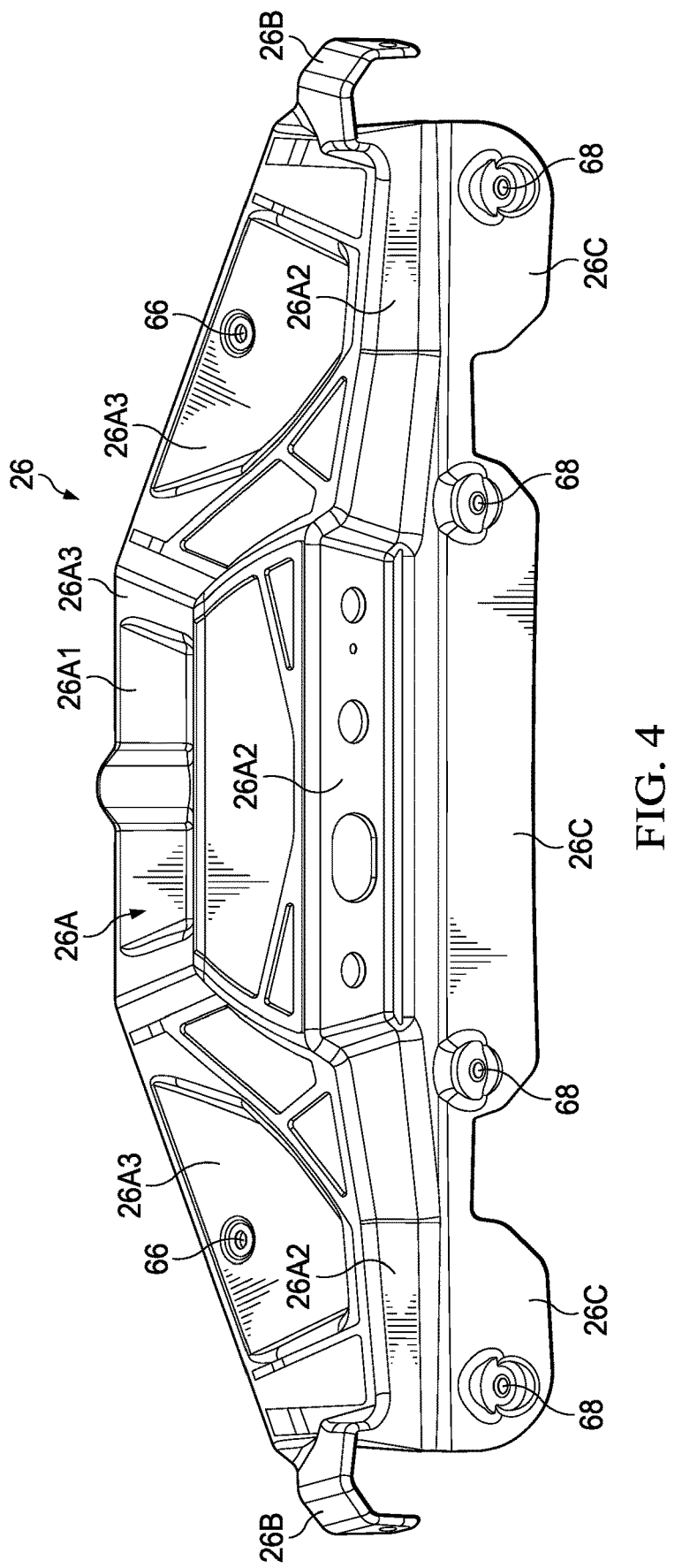
FIG. 4 is an exemplary rear view of the taillight housing fixture of the taillight and snow flap assembly shown in FIG. 3 in accordance with various embodiments of the present disclosure.
Figure 8:
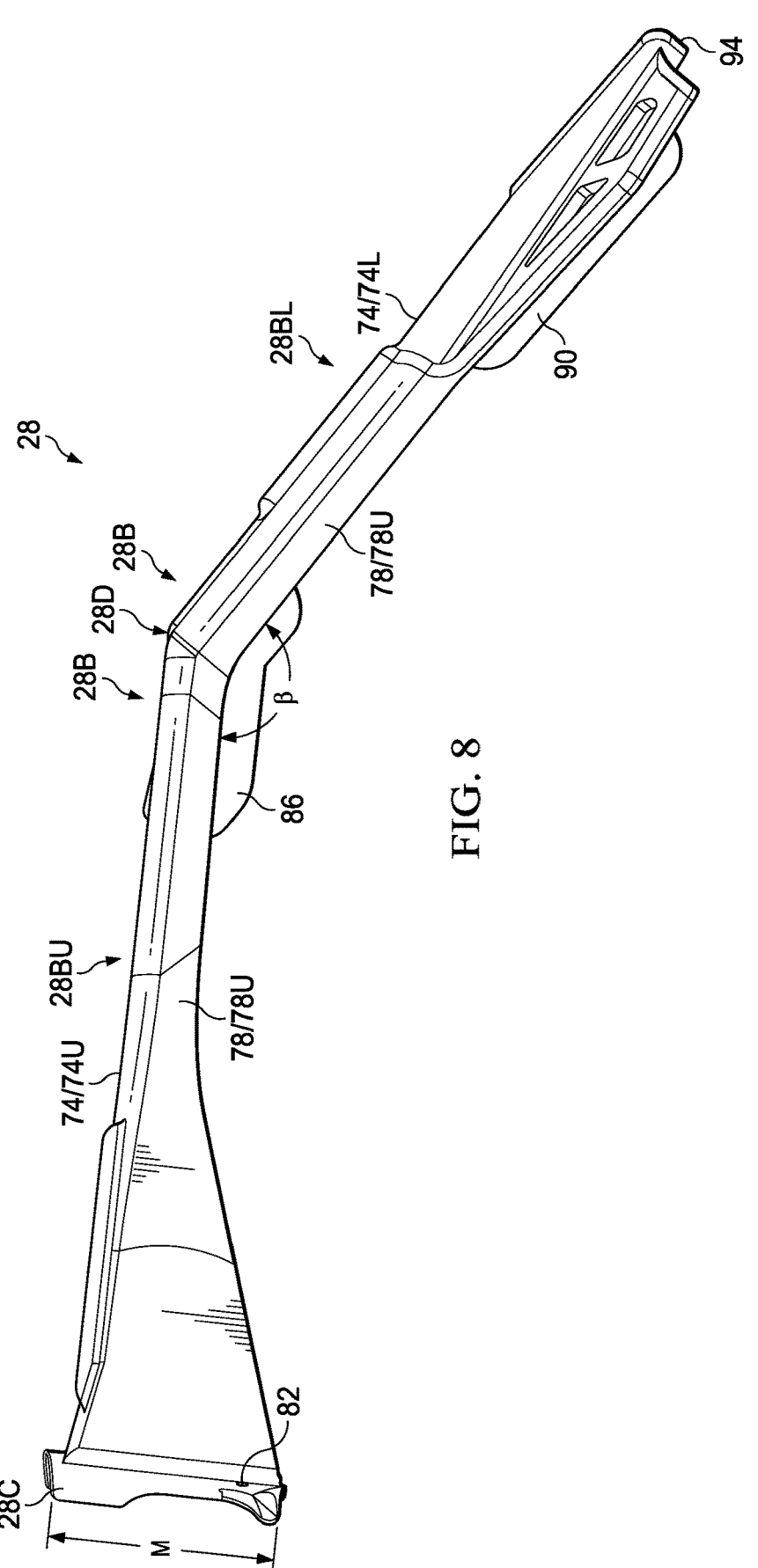

FIG. 8 is an exemplary side view of a snow flap of the taillight and snow flap assembly shown in FIGS. 1 and 2 in accordance with various embodiments of the present disclosure.

Figure 9:
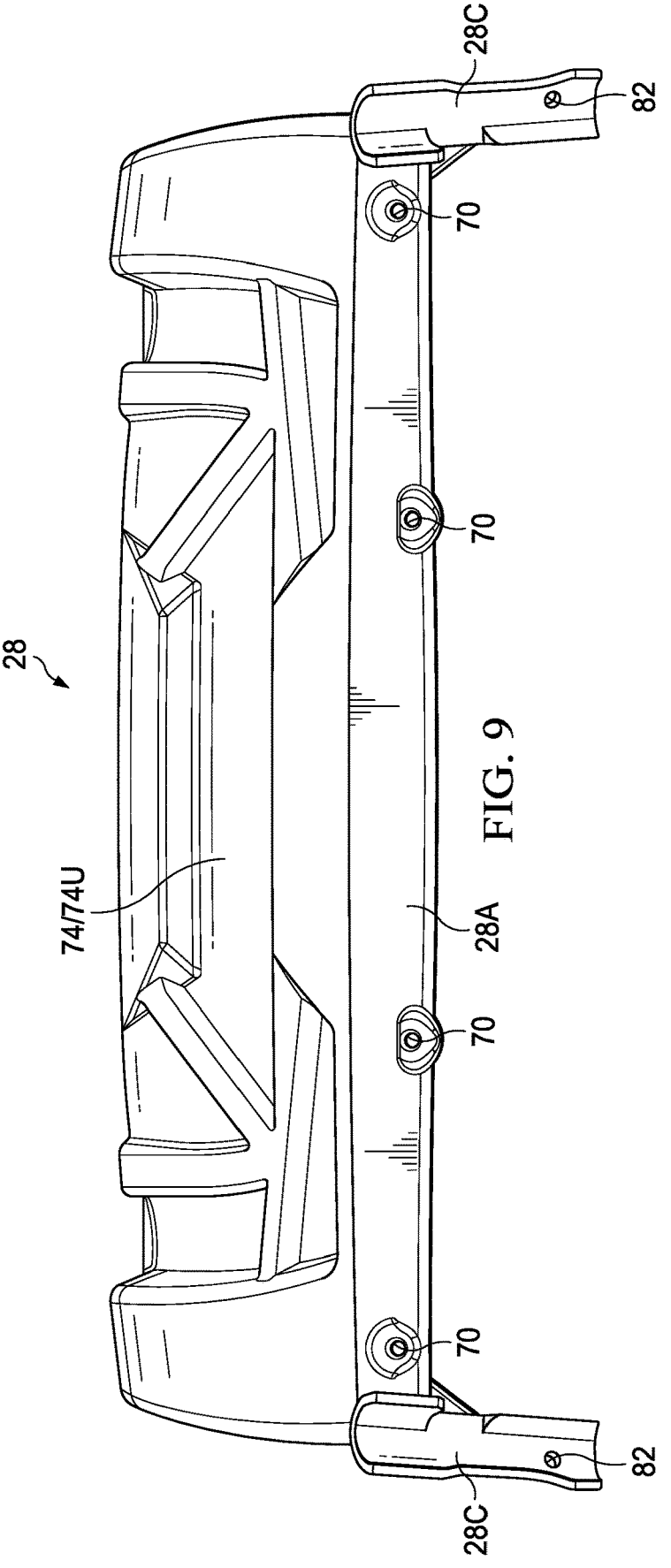

FIG. 9 is an exemplary top view of the snow flap shown in FIG. 8 in accordance with various embodiments of the present disclosure.

Figure 10:
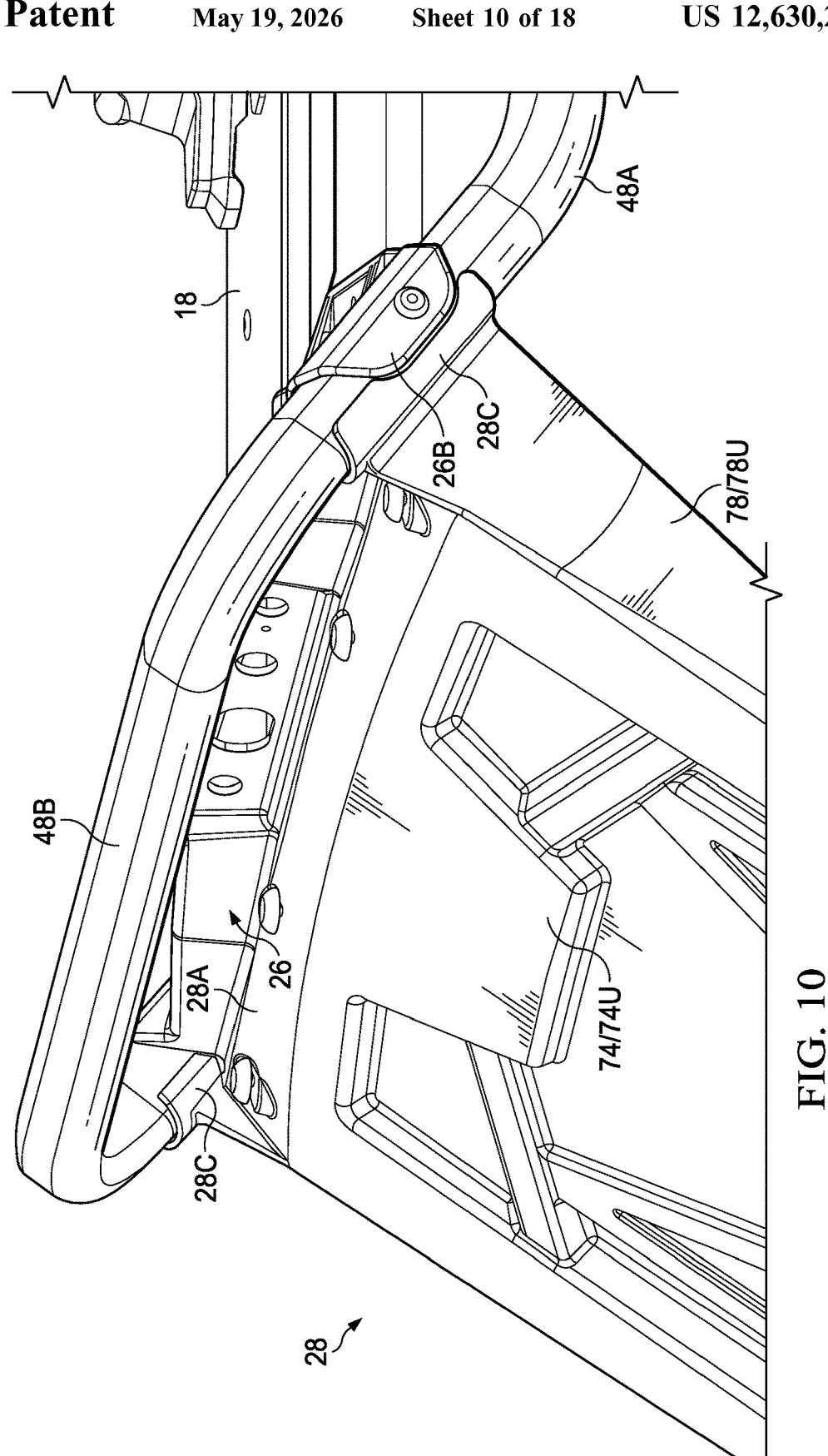

FIG. 10 is an exemplary isometric view of a portion of the taillight and snow flap assembly shown in FIGS. 1 and 2 mounted to the tunnel and the bumper/hand bar in accordance with various embodiments of the present disclosure.

Figure 11:
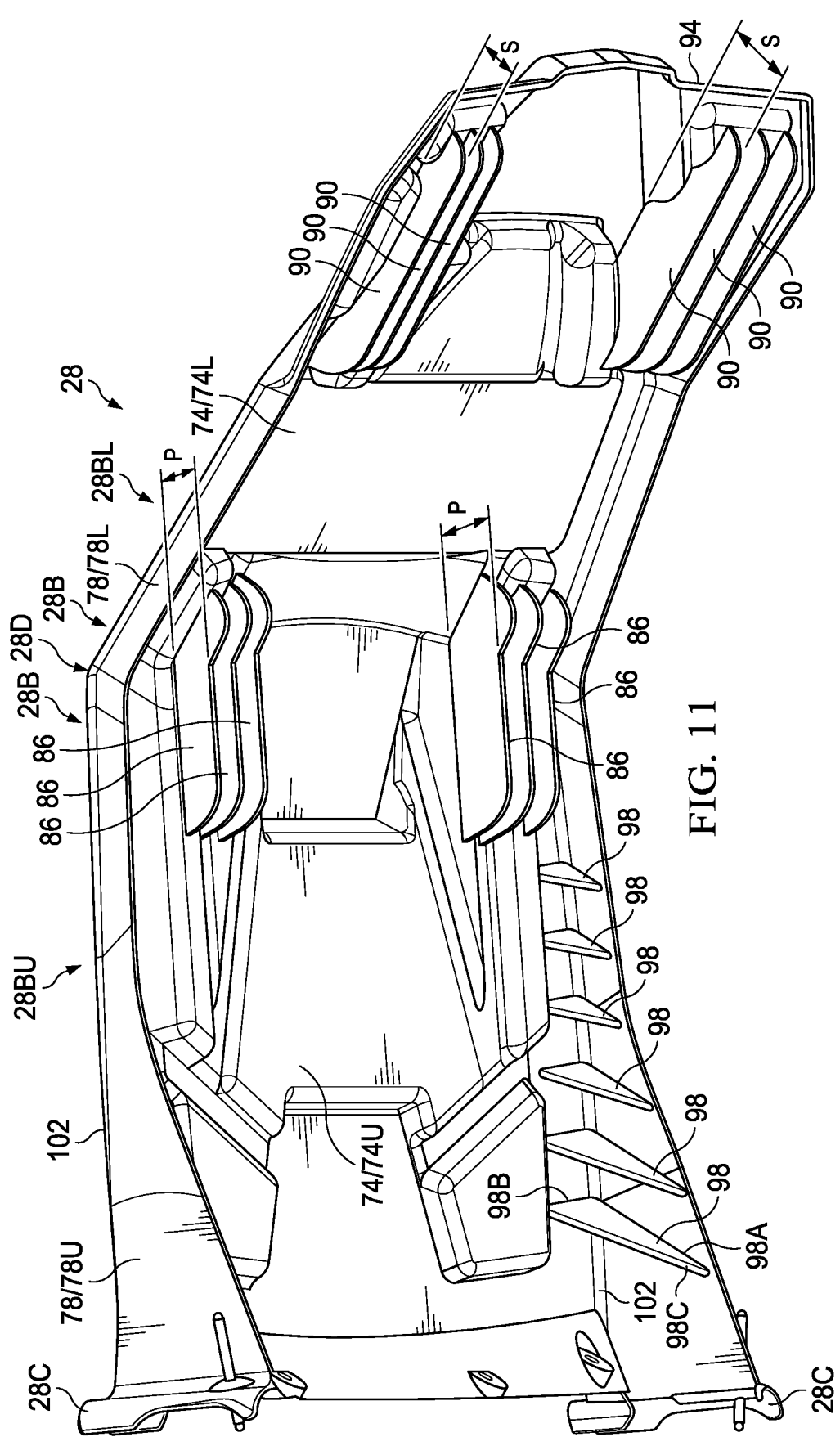

FIG. 11 is an exemplary isometric view of an underside of the snow flap shown in FIG. 10 in accordance with various embodiments of the present disclosure.

Figure 12:
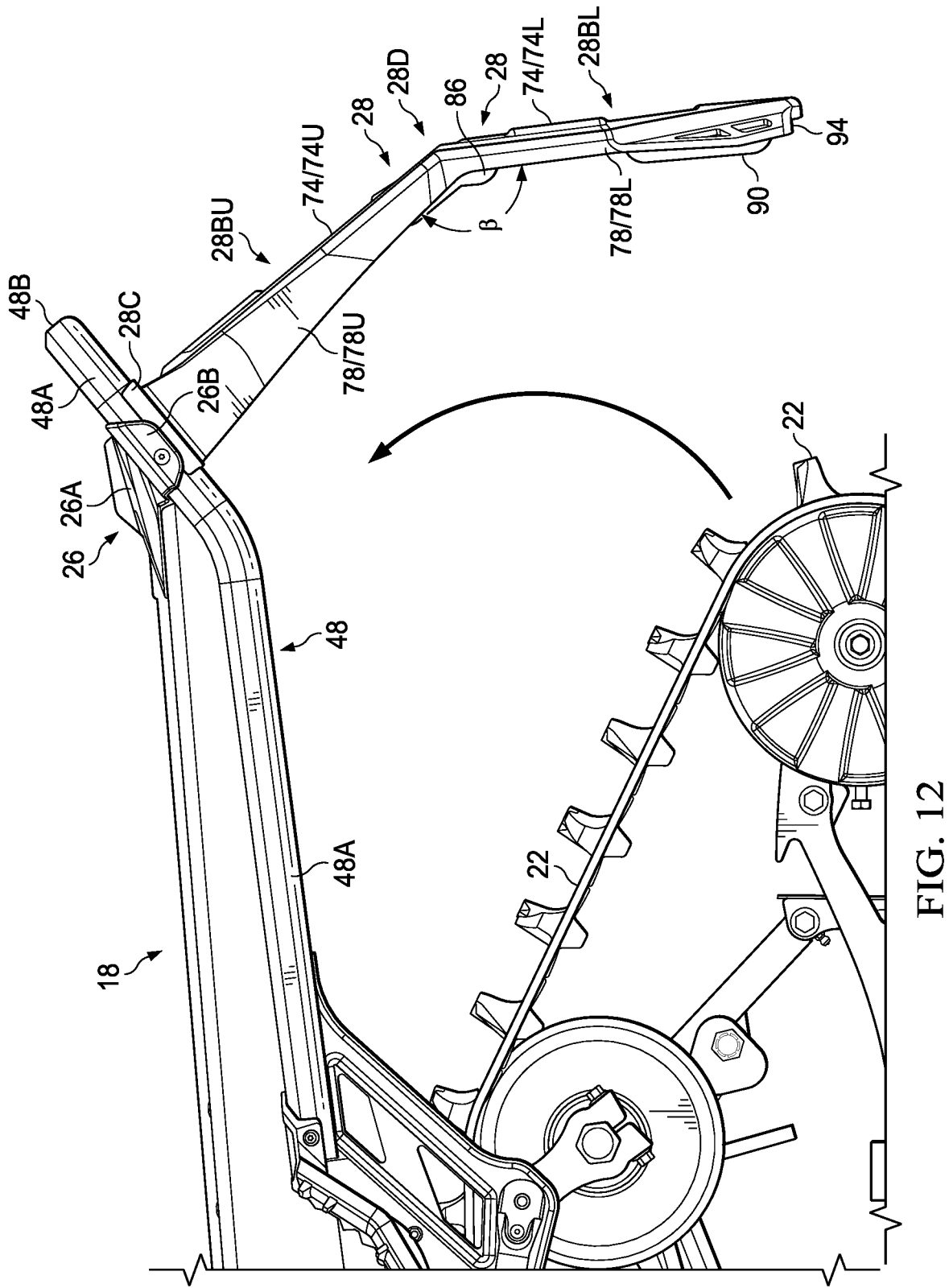

FIG. 12 is an exemplary side view of the taillight and snow flap assembly shown in FIGS. 1 and 2 mounted to the tunnel and the bumper/hand bar in accordance with various embodiments of the present disclosure.

Figure 13:
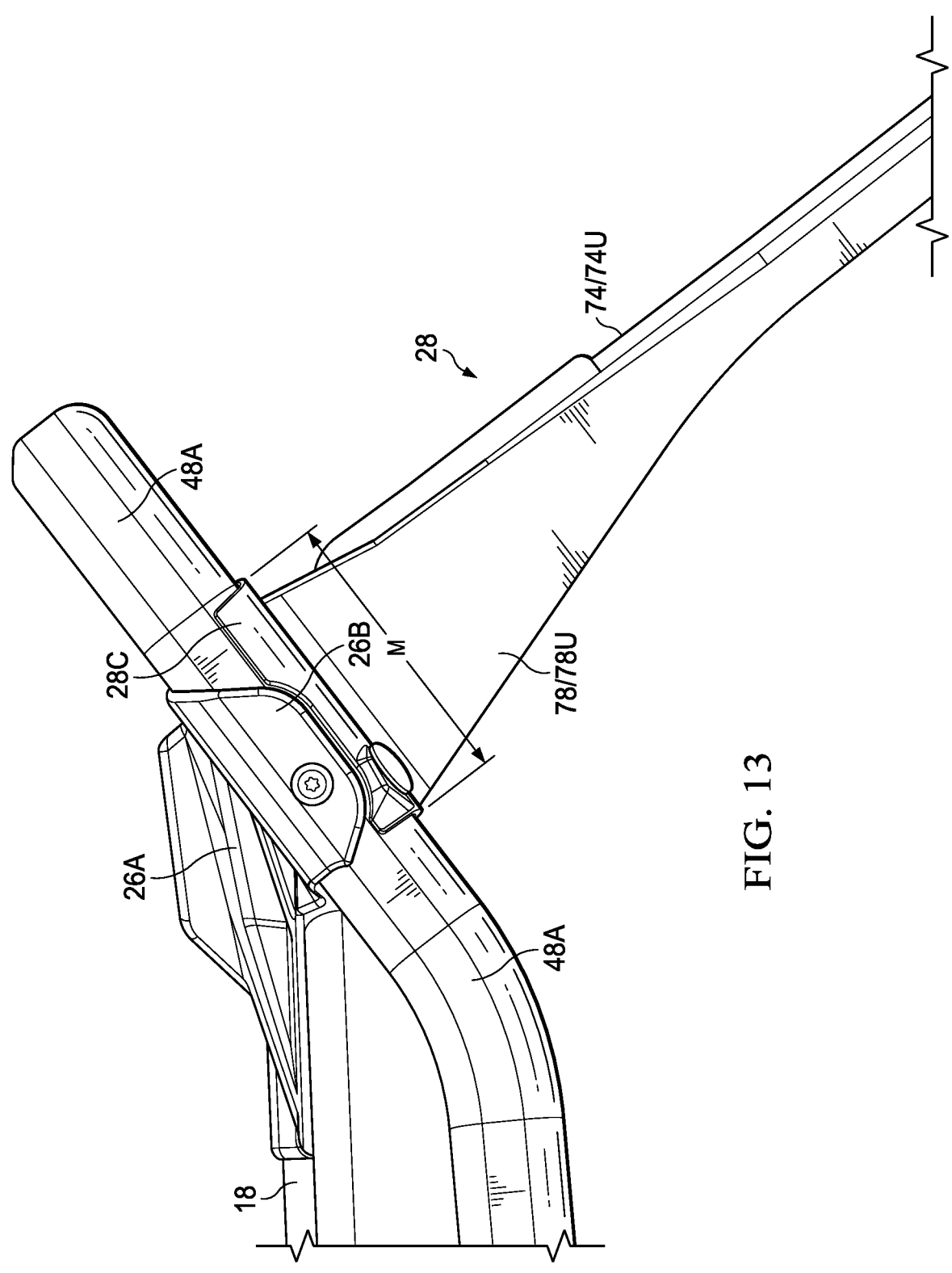

FIG. 13 is an exemplary side view close-up of a portion of the taillight and snow flap assembly shown in FIGS. 1 and 2 mounted to the tunnel and the bumper/hand bar in accordance with various embodiments of the present disclosure.

Figure 14:
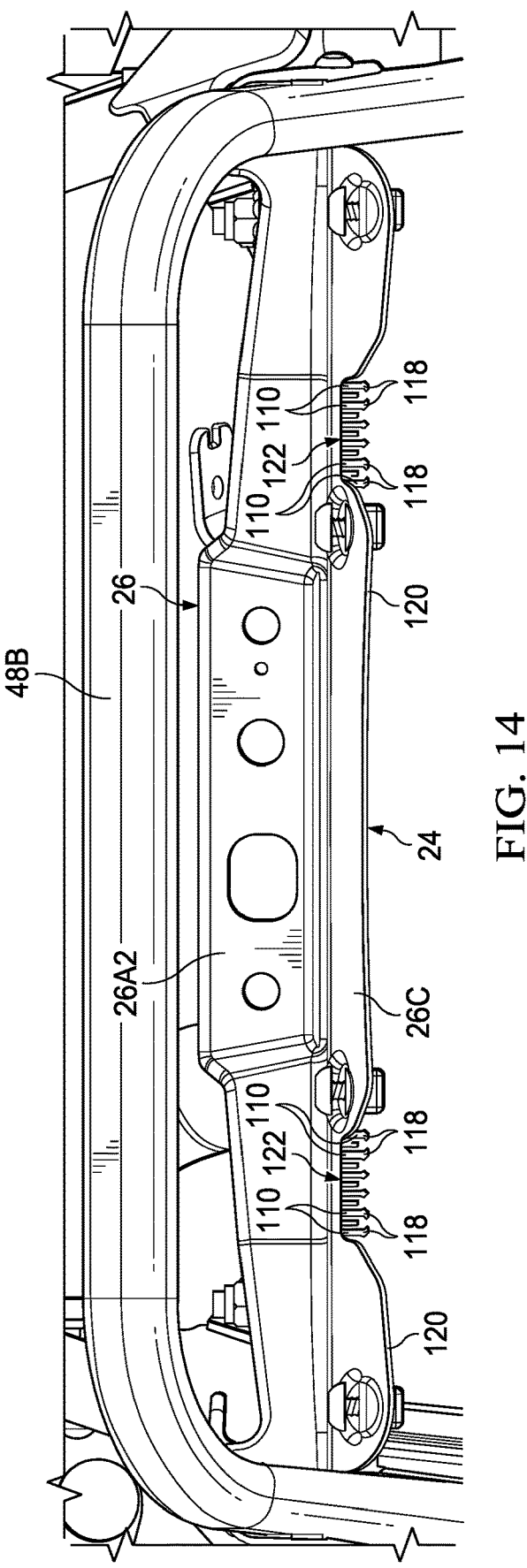

FIG. 14 is an exemplary rear view of the taillight housing fixture shown in FIGS. 1 through 7 comprising at least one heat exchanger shield access port, whereby one or more heat exchanger shield can be installed and removed from a heat exchanger of the snowmobile without removal of the taillight housing fixture in accordance with various embodiment so of the present disclosure.

Figure 15:
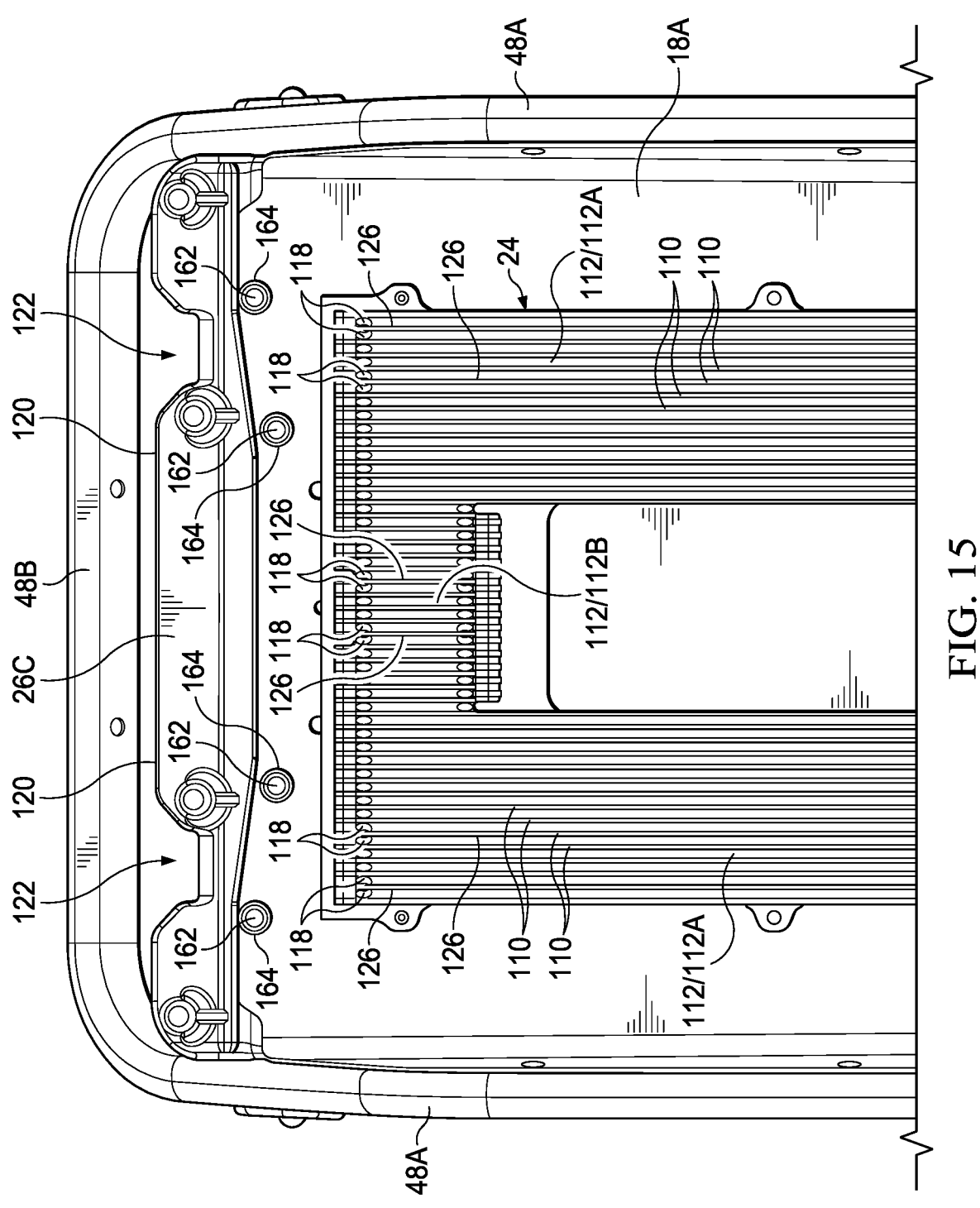

FIG. 15 is an exemplary view of an underside of the snowmobile tunnel having the heat exchanger mounted thereto, and of the taillight housing fixture shown in FIG. 14 having the heat exchanger shield access port(s) in accordance with various embodiment so of the present disclosure.

Figure 16:
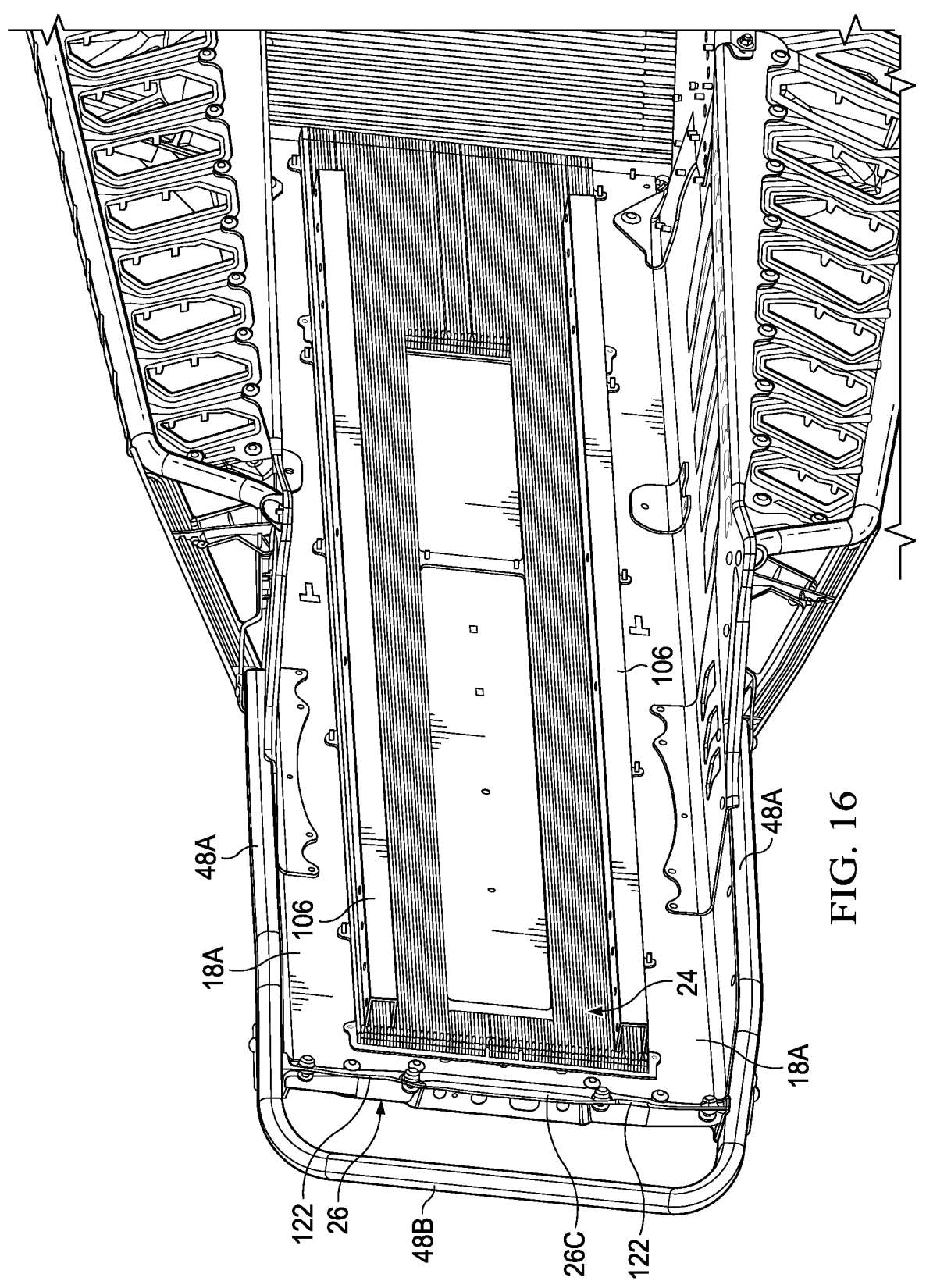

FIG. 16 is an exemplary isometric view of the underside of the snowmobile tunnel and taillight housing fixture shown in FIG. 15 in accordance with various embodiment so of the present disclosure.

Figure 17:
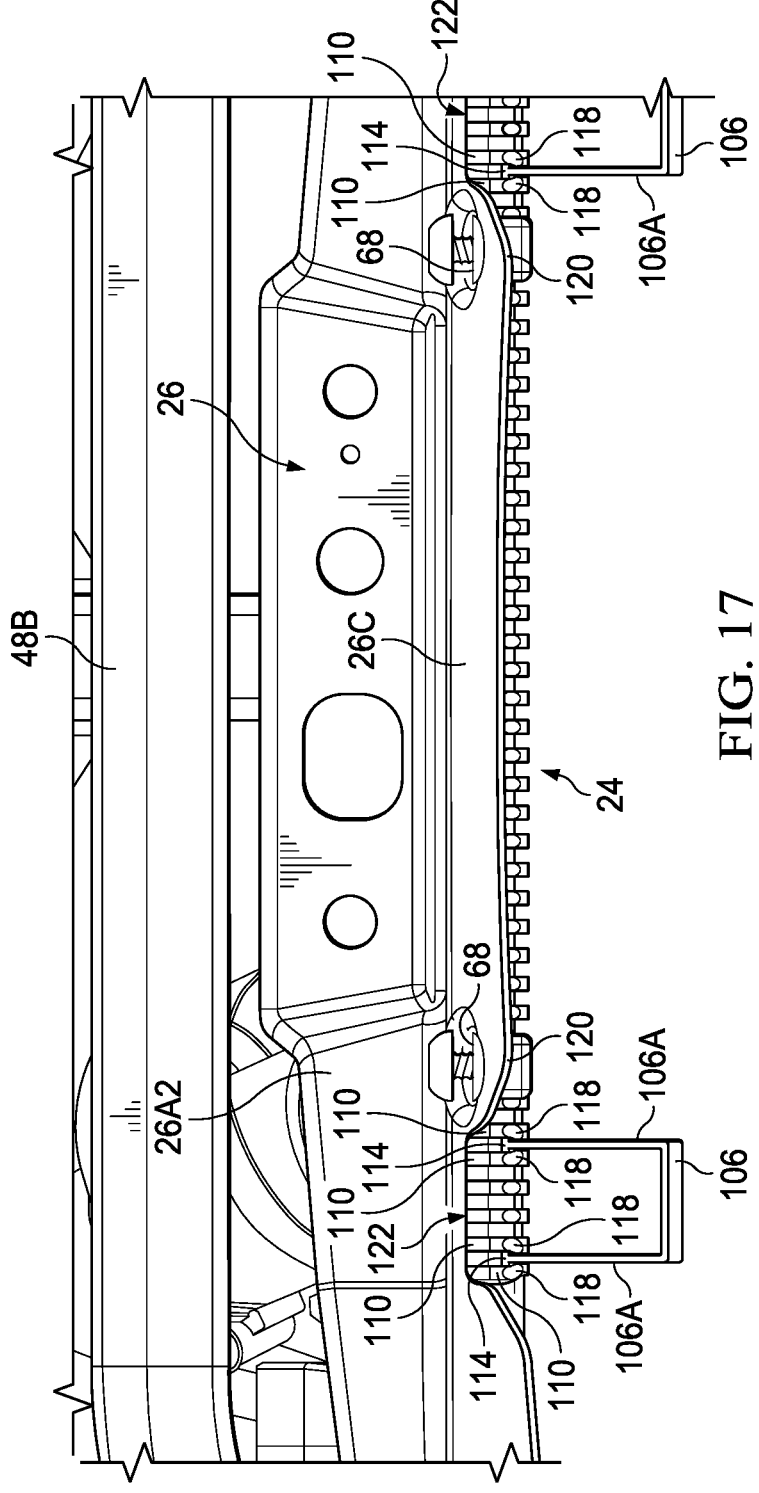

FIG. 17 is an exemplary close-up rear view of the taillight housing fixture shown in FIGS. 14, 15 and 16 exemplarily illustrating how the heat exchanger shield access port(s) allow for easy installation and removal of the heat exchanger shields without removal of the taillight housing fixture in accordance with various embodiment so of the present disclosure.

Figure 18:
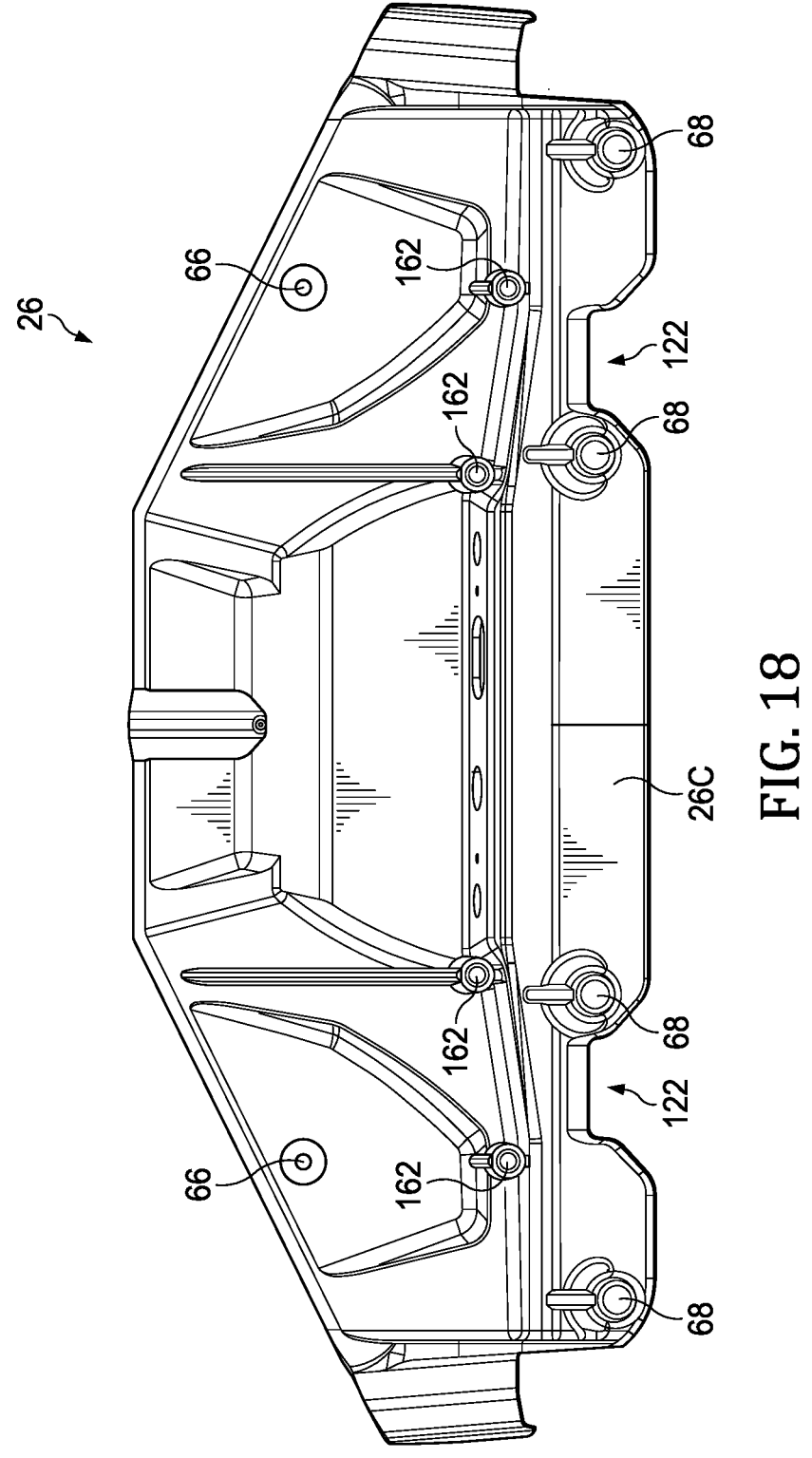

FIG. 18 is an exemplary illustration of an underside of the taillight housing fixture shown in FIGS. 3 through 7, in accordance with various embodiments of the present disclosure.

Corresponding reference numerals indicate corresponding parts throughout the several views of drawings.

DETAILED DESCRIPTION

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises", "comprising", "including", and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on", "engaged to or with", "connected to or with", or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on", "directly engaged to", "directly connected to", or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between", "adjacent" versus "directly adjacent", etc.).

As used herein the phrase "operably connected to" will be understood to mean two are more elements, objects, devices, apparatuses, components, etc., that are directly or indirectly connected to each other in an operational and/or cooperative manner such that operation or function of at least one of the elements, objects, devices, apparatuses, components, etc., imparts or causes operation or function of at least one other of the elements, objects, devices, apparatuses, components, etc. Such imparting or causing of operation or function can be unilateral or bilateral.

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) taught herein, and because many modifications may be made in the embodiments described herein, it is to be understood that the details herein are to be interpreted as illustrative and non-limiting.

Referring to FIGS. 1 and 2, in various embodiments the present disclosure provides snowmobile 10 comprising a taillight housing fixture 26 and a snow flap 28 that can be used separately or together as a taillight and snow flap assembly 14. One or both of the taillight housing fixture 26 and the snow flap 28 can be structured and operable to provide structural reinforcement, rigidity, strength and stability to a drive track tunnel 18 (referred to herein simply as the tunnel 18) and to direct snow thrown from a drive track 22 of the snowmobile 10 onto a heat exchanger 24 for an internal combustion engine or a component of an electrical vehicle such as a battery or motor (see FIG. 14 through 17) disposed on an underside of the tunnel 18. The taillight housing and snow flap assembly 14 comprises the taillight housing fixture 26 and the snow flap 28 connected to taillight housing fixture 26 The snowmobile 10 additionally generally comprises a chassis or frame 30, the tunnel 18 connected to the chassis 30, a prime mover 34 (e.g., an internal combustion engine (ICE) and/or an electric motor) mounted to the chassis 30, the drive track 22 disposed within the tunnel 18 and operatively connected to a drivetrain 38, which is operatively connected to the prime mover 34 and configured to provide motive power provided by the prime mover 34 to the drive track 22 to thereby propel the snowmobile 10. The snowmobile 10 further includes an operator/passenger seat 44, at least one ski 42 (e.g., in various instances two skis 42) operably connected to a steering mechanism 46 (e.g., a steering wheel or steering handlebars) that is used by the snowmobile operator to control the direction of travel or movement of the snowmobile 10, and a bumper/hand bar 48 that is mounted to the chassis 30.

The tunnel 18 is mounted to the chassis 30 and provides a main body portion of the snowmobile 10. The tunnel 18 generally houses a portion of the drivetrain 38 and an upper portion of the drive track 22 as the drive track 22 is disposed on and travels around a track guide and drive assembly (e.g., the drive gears, idler gears, high-fax/slide rail, rear suspension, etc.). The tunnel 18 comprises a main panel 18A and opposing side panels 18B extending at an angle (e.g., generally orthogonally or any other desired angle) from opposing lateral edges 18C of the main panel 18A to form a three-sided tunnel or channel. As described above, the tunnel provides a main portion of the snowmobile body to which various components (e.g., seat 44, the heat exchanger 24, and a pair of opposing running boards 50) can be mounted, attached or connected. The tunnel 18 also provides protection to the snowmobile operator/passenger from the rotating drive track 22, the drivetrain 38, and snow, rocks, ice, sticks and other debris thrown up by the rotating drive track 22. The tunnel 18 can be constructed or fabricated of any material suitable to provide the desired shape and structure of the tunnel 18 as described herein. For example, in various instances the tunnel 18 can be fabricated of a light gauge sheet metal, a fiber reinforced polymer, additive manufacturing, or any other suitable metal, polymer or plastic composite or compound. In a non-limiting example, the main panel 18A and the side panels 18B can be integrally formed from a single sheet of material, or comprised of separate components fastened together. Due to the light weight and three-sided structure of the tunnel 18, the tunnel 18 is generally subject to be pliable or flexible in that it can flex, bend and twist absent further reinforcement such as the bumper/hand bar 48 and taillight housing fixture 26 described herein below.

Referring now to FIGS. 3, 4, 5, 6 and 7, as described above, the taillight housing and snow flap assembly 14 can be structured and operable to provide structural reinforcement, rigidity, strength and stability to the tunnel 18. More particularly, the taillight housing fixture 26 is structured and operable to provide structural reinforcement, rigidity, strength and stability to the tunnel 18 such that flexing, bending and twisting of the tunnel 18 is reduced or prevented. In various embodiments, the tunnel 18 is connected to the bumper/hand bar 48, which can also add structural reinforcement, rigidity, strength and stability to the tunnel 18. The taillight housing fixture 26 can be constructed or fabricated of any material suitable to provide the desired shape and structure of the taillight housing fixture 26 as described herein. For example, in various instances the taillight housing fixture can be fabricated of a light gauge stamped sheet metal, a fiber reinforced polymer, additive manufacturing, or any other suitable metal, polymer or plastic composite or compound. In an illustrative example, the taillight housing fixture 26 is a composite material comprising glass fibers in a polymer matrix.

More Particularly, in various embodiments, the taillight housing fixture 26 can be fabricated of a polymer composite that includes Nylon 6/6 or Nylon 12, Polyetheretherketone (PEEK), Polypropylene (PP), polybutylene terephthalate (PBT), or Polyphthalamide (PPA) matrix material with glass, carbon, or ratio of both carbon and fiber material for fiber fill varying in percent volume from 50% to 60%. For example, the taillight housing fixture 26 can be manufactured of a molded composite material, such as a glass filled long-fiber material. Portions of the taillight housing fixture 26 can have differing thickness to optimize stiffness and weight. For example, the main body 26A can include more thickness and structural support ribbing as opposed to the retention wings 26B and/or the flap mounting tail 26C in order meet stiffness requirements. For example, in various exemplary embodiments, the taillight housing fixture 26 can be fabricated of a composite including one or more of the above-described polymers and one or more types of fibers including, but not limited to, glass and/or carbon fibers, e.g., 50 wt % glass filled polyamide. In a non-limiting example, the fiber % by weight of the composite material can range from 20 wt % to 60 wt %, and can optionally be in the range of 40 wt % to 50 wt %. These materials have the advantages of being tough enough to withstand impacts while also being flexible enough to withstand any torquing and/or twisting of the bumper/hand bar 48 and tunnel 18 during use of the snowmobile 10. In addition, these polymeric composite materials have a low thermal conductivity (i.e., less than 1 W/m-*K).

The taillight housing fixture 26 comprises a main body 26A having a top surface 26A1 and a rear lens face 26A2 extending downward from a trailing or rearward edge of the top surface 26A1. One or more illumination or light fixture (i.e., at least one light bulb, LED or other illumination device housed within a lens housing) and/or lens 54 (e.g., brake light fixture and/or lens, direction indicator light fixture and/or lens, running light fixture and/or lens, etc.) and/or one or more reflector or reflective lens 58 can be removably or fixedly mounted to the rear lens face 26A2. The taillight housing fixture 26 additionally comprises a pair of opposing retention arms or wings 26B extending from opposing lateral ends of the main body 26A and a flap mounting tail 26C extending longitudinally rearwardly outward at an angle (e.g., 30° to) 90° from a bottom of the rear lens face 26A2 of the main body 26A. As used herein longitudinal will refer to a direction or relationship of components or elements that extends from the front to the back of the snowmobile 10 and/or vice-versa. And, as used herein lateral will refer to a direction or relationship of components or elements that extends from the side to the side of the snowmobile 10. The retention wings 26B extend laterally outward from the lateral ends of the main body 26 having a curved or a C-like shape that is contoured and shaped to mate or match with the shape and contour of an outer surface of the bumper/hand bar 48 such that each retention wing 26B can be disposed over and snuggly or tightly fit over or mate with opposing side portions of the bumper/hand bar 48. Additionally, the retention wings 26B have a longitudinal length L and at least one fastening orifice 62. The fastening orifice(s) 62 is/are structured and operable to have a fastener (e.g., screw, rivet, bolt, expanding push fastener, etc.) inserted therethrough to attach and secure the taillight housing fixture 26 to the bumper/hand bar 48. In a non-limiting example, the retention wings 26B are removably fastened to the bumper/hand bar 48.

The length L of the retention wings 26B is designed and structured to provide stability to taillight housing fixture 26 when the taillight housing fixture is secured to the bumper/hand bar 48. More specifically, the length L of the retention wings 26B is designed and structured to have a length (e.g., 3, 4, 5, 6 or more inches) such that when secured to the bumper/hand bar 48, via fasteners and fastening orifices 62, the leverage from the fastening orifices 62 and fastener to the opposing distal ends of the retention wings (relative to the length L) will provide stability to the taillight housing fixture 26 and prevent the taillight housing fixture 26 from pivoting, rocking or wobbling about the fasteners, or otherwise moving on the bumper/hand bar 48. Additionally, since the shape and contour of the retention wings 26B mates or matches with the shape and contour of an outer surface of the bumper/hand bar 48, the contact surface area between the retention wings 26B and the outer surface of the bumper/hand bar 48 is maximized (e.g., 80% to 100% contact surface area is provided between the retention wings 26B and the outer surface of the bumper/hand bar 48). In a non-limiting example, the retention wings 26B are engaged with at least portions of the inboard side, the outboard side, and a forward side of the bumper/hand bar 48. This maximized contact surface further provides stability to the taillight housing fixture 26 on the bumper/hand bar 48 and prevents pivoting or rocking about the fasteners, or otherwise moving on the bumper/hand bar 48.

The bumper/hand bar 48 is structured to have opposing side rails 48A that extend longitudinally along the tunnel side panels 18B, that mount to the chassis 30, and to which the tunnel side panels 18 are attached, thereby providing structural reinforcement, rigidity, strength and stability to the tunnel 18. The bumper/hand bar 48 additionally includes a rear crossbar 48B extending from and between rearward distal ends of the side rails 48A rearwardly beyond the rearward end of the tunnel 18. In various embodiments, a rearward end portion of the side rails 48A are bent upward at an angle (e.g., a 10° to 90° angle) such that the crossbar 48B is disposed rearwardly beyond the rearward end of the tunnel 18 and above a plane of the tunnel main panel 18A. More specifically, the length of the side bars 48A are designed so that the rear crossbar 48B is disposed beyond and above the rearward distal end of the tunnel 18 such that a gap or space is provided between the rearward distal end of the tunnel 18 and the crossbar 48B. The taillight housing fixture 26 can be disposed and mounted to the tunnel 18 and to the bumper/hand bar side rails 48A within the gap or space.

In such embodiments, the retention wings 26B can be disposed on the angled upward portion of the side bars 48A, whereby the taillight housing fixture 26 can be mounted to the angled upward portion of the side bars 48A, via the wing fastening orifices 62, such that a bottom surface of a leading edge portion 26A3 of the taillight housing fixture main body 26A is substantially coplanar and flush with the plane of the tunnel main panel 18A. As exemplarily shown in FIGS. 12 and 13, the leading edge portion 26A3 can be positioned along the tunnel 18 at or forward of where a straight section of the bumper/hand bar side rails 48A begins to curve upward towards the bumper/hand crossbar 48B. In various embodiments, the taillight housing leading edge portion 26A3 includes one or more attachment orifice 66 that structured and operable to have a fastener (e.g., screw, rivet, bolt, expanding push fastener, etc.) inserted therethrough to attach and secure the taillight housing fixture 26 to the rearward distal end of the tunnel 18, thereby providing structural reinforcement, rigidity, strength and stability to the tunnel 18. In a non-limiting example, the taillight housing fixture 26 is removably fastened to the tunnel main panel 18A. In various instances, the fastener (e.g., screw, rivet, bolt, expanding push fastener, etc.) inserted through attachment orifice 66 to attach and secure the taillight housing fixture 26 to the rearward distal end portion of the tunnel 18 can further secure at least a portion of the heat exchanger 24 (e.g., a rearward end of the heat exchanger 24) to an underside of the tunnel 18 as exemplarily illustrated in FIGS. 15 and 16.

As described above, the taillight housing fixture 26 can be fabricated of a light gauge stamped sheet metal, a fiber reinforced polymer, additive manufacturing, or any other suitable metal, polymer or plastic composite or compound. Additionally, in various embodiments, the taillight housing fixture 26 is constructed to be substantially sturdy, stout, rigid and not easily flexible such that when connected to the tunnel 18 and the bumper/hand bar 48 the taillight housing fixture 26 will provide structural reinforcement, rigidity, strength and stability to the tunnel 18, and will minimize, control or substantially prevent flexing, twisting and other movement of the tunnel 18. More particularly, as result of the bumper/hand bar 48 being connected to the chassis 30, the shape, contour and length of the taillight housing fixture retention wings 26B, the secure mounting of the taillight housing fixture 26 to the bumper/hand bar 48, and the sturdy construction of the taillight housing fixture 26, when connected to the rearward end of the tunnel 18 the taillight housing fixture 26 provides structural reinforcement, rigidity, strength and stability to the tunnel 18 whereby flexing, twisting and other movement of the tunnel 18 is minimized, controlled or substantially prevented. This, in turn, significantly reduces or prevents damage to the tunnel 18 and/or the heat exchanger 24 that can result from uncontrolled, or unrestrained flexing, twisting and other movement of the tunnel 18.

Referring now to FIGS. 8 through 13, the snow flap 28 generally comprises a mounting lip 28A, a main body 28B extending from the mounting lip 28A and a pair of opposing retention arms 28C extending from ends of opposing lateral sidewalls 78 of the main body 28B. The snow flap 28 is attachable to the taillight housing fixture flap mounting tail 26C. In various embodiments, the flap mounting tail 26C includes a plurality of flap mounting holes 68, and the mounting lip 28A of the snow flap 28 includes a plurality of fastening orifices 70 that are disposed in the mounting lip 28A to align with the taillight housing fixture flap mounting holes 68 such that fasteners (e.g., rivets, screws, nuts and bolts, self-securing push fasteners, etc.) can be inserted therethrough to securely and optionally, removably, fasten the snow flap 28 to the taillight housing fixture 26. In a non-limiting example, the flap mounting tail 26C extends rearward and optionally downward from the rear end of the tunnel 18. Therefore, the snow flap 28 can be secured to the flap mounting tail 26C without being directly secured to the tunnel 18. As shown in FIG. 7, the flap mounting holes 68 in the flap mounting tail 26C are positioned rearward of the rear end of the tunnel 18 and forward of the bumper/hand crossbar.

The flap main body 28B comprises and upper portion 28BU extending from the mounting lip 28A and lower portion 28BL extending at an angle β from the upper portion 28BU, thereby defining an elbow or bend 28D in the main body 28B. The angle β can be any desired obtuse angle. For example, in various embodiments angle β can be an angle between 95° and 175°. Additionally, the main body 28B comprises a central panel 74 and the opposing lateral sidewalls 78 extending at an angle (e.g., generally orthogonally or any other desired angle) from opposing edges of the central panel 74. The central panel 74 and sidewalls 78 respectively have an upper portion 74U and 78U, and a lower portion 74L and 78L that respectively make up the main body upper and lower portions 28BU and 28BL.

The retention arms 28C extend from the opposing ends of the sidewalls 78, more specifically the retention arms 28C extend from the opposing ends of the sidewall upper portions 78U having a curved a C-like shape that is contoured and shaped to mate or match with the shape and contour of the outer surface of the bumper/hand bar 48 such that each retention arm 28C can be disposed over and snuggly or tightly fit over or mate with opposing side portions of the bumper/hand bar 48. Additionally, the retention arms 28C have a longitudinal length M and at least one fastening aperture 82. The length M of the retention arms 28C can be greater than the length L of the retention wings 26B. The fastening apertures(s) 82 is/are structured and operable to have a fastener (e.g., screw, rivet, bolt, expanding push fastener, etc.) inserted therethrough to attach and secure the snow flap 28 to the bumper/hand bar 48. The fastening aperture 82 can be positioned to insert the fastener into the rearward side of the bumper/hand bar 48. The fastener inserted through the fastening aperture 82 can be positioned along the bumper/hand bar 48 lower than the fastener inserted through the attachment orifice 62 of the retention wings 26B. The fastener inserted through the fastening aperture 82 can extend into the bumper/hand bar 48 in a direction that is perpendicular to the direction that the fastener inserted into the bumper/hand bar 48 extends through the attachment orifice 66 of the retention wings 26B.

The length M of the retention arms 28C is designed and structured to provide stability to snow flap 28 when the snow flap 28 is secured to the bumper/hand bar 48. More specifically, the length M of the retention arms 28C is designed and structured to have a length (e.g., 3, 4, 5, 6 or more inches) such that when secured to the bumper/hand bar 48, via fasteners and fastening apertures 82, the leverage from the fastening aperture 82 and fastener to the opposing distal ends of the retention arms 28C (relative to the length M) will provide stability to the snow flap 28 and prevent or inhibit the snow flap 28 from pivoting, rocking or wobbling about the fasteners, or otherwise moving on the bumper/hand bar 48. Additionally, since the shape and contour of the retention arms 28C mates or matches with the shape and contour of an outer surface of the bumper/hand bar 48, the contact surface area between the retention arms 28C and the outer surface of the bumper/hand bar 48 is maximized (e.g., 80% to 100% contact surface area is provided between the retention arms 28C and the outer surface of the bumper/hand bar 48). This maximized contact surface further provides stability to the snow flap 28 on the bumper/hand bar 48 and prevents pivoting or rocking about the fasteners, or otherwise moving on the bumper/hand bar 48. In various embodiments, the retention arms 28C engage bumper/hand bar 48 adjacent to and opposite the retention wings 26B of the taillight housing fixture 26.

In a non-limiting example, the retention arms 26C are engaged with at least portions of the inboard side, the outboard side, and a rearward side of the bumper/hand bar 48. As shown in FIGS. 9, 10, and 13, one or both of the inboard and the outboard sides of the retention arms 26C can be recessed to accommodate the shape of the retention wings 26B. In a non-limiting example, at least a portion of the retention wings 26B can be positioned in the recess of the inboard and outboard sides of the retention arms 26C. In a non-limiting example, positioning of the retention arms 28C on the outboard sides of the snow flap 28 and securing the snow flap 28 to the mounting tail 26C that is positioned below the rear end of the tunnel 18 allows the mounting lip 28A to have a substantially flat shape that conforms to the surface of the flap mounting tail 26C of the taillight housing fixture 26, thereby entirely positioning the mounting lip 28A and the main body 28B of the snow flap 28 below any light lens 54 and/or reflective lens 58 positioned on the rear lens face 26A2 of the taillight housing fixture 26. Therefore, the snow flap 28 provides an unobstructed view of any light lens 54 and/or reflective lens 58 positioned on the rear lens face 26A2, and maximizes hand clearance between the snow flap 28 and the bumper/hand crossbar 48B.

Referring particularly to FIGS. 8, 11 and 12, in various embodiments, the snow flap 28 comprises a plurality of support and guide ribs 86 formed within the elbow 28D on an interior or underside of snow flap 28. The support and guide ribs 86 extend from the elbow 28D along a portion of the underside of main body upper portion 28BU and along a portion of the underside of main body lower portion 28BL.

The support and guide ribs 86 are formed within the elbow 28D and spaced apart along the entire width, or one or more section of the width, of the interior side of the snow flap 28. In various embodiments, the support and guide ribs 86 can be evenly spaced apart along the entire width, or one or more section of the width, of the interior side of the snow flap 28, while in other embodiments the support and guide ribs 86 can be unevenly spaced apart along the entire width, or one or more section of the width, of the interior side of the snow flap 28. In various embodiments, the support and guide ribs 86 can be formed and spaced along the entire width of the interior side of the snow flap 28, while in other embodiments the support and guide ribs 86 can be formed in one or more group disposed along one or more portion or section of the width of the interior side of the snow flap 28. Furthermore, in various embodiments the support and guide ribs 86 can have a consistent height P along their entire length, while in other embodiments the height P of the support and guide ribs 86 can increase and/or decrease, vary or undulate along their length. In various embodiments, the height(s) of P can be the same for each support and guide rib 86 (e.g., all support and guide ribs 86 have the same size, form, geometry and profile), while in other embodiments one or more of the supports and guide ribs 86 can have a size, form, geometry and/or profile than at least one other support and guide rib 86.

The support and guide ribs 86 are structured and operable to provide structural support of the snow flap 28 along the elbow 28D such that the snow flap 28 is inhibited from bending or collapsing along the elbow 28D, and more particularly along the length of the support and guide ribs 86. More particularly, if the snow flap 28 is impacted (e.g., the distal end of the main body lower portion 28BL contacts/impacts the ground/snow), the structure and guide ribs 86 can prevent bending of the snow flap at the elbow 28D and directs or causes any bending or flexing of the snow flap 28 to occur at or within the portion of the main body lower portion 28BL extending below the structure and guide ribs 86. The support and guide ribs 86 are further structured and operable to direct snow thrown up by the drive track 22 along the flap main body central panel upper portion 74U onto the underside of the tunnel 18, and more particularly onto the heat exchanger 24, to thereby improve the cooling efficiently of the heat exchanger 24.

In various embodiments, the snow flap 28 can additionally include a plurality of anti-hooking ribs 90 formed on the interior or underside of snow flap 28 along a distal end section of the main body lower portion 28BL. The anti-hooking ribs 86 extend from or near a distal end 94 of the main body lower portion 28BL (also the distal end of the lower snow flap 28) upward toward the elbow 28D and can have any desired length relative to a distance between the distal end 94 and the support and guide ribs 86. The anti-hooking ribs 90 can be spaced apart along the entire width, or one or more section of the width, of the distal end section of the main body lower portion 28BL. In various embodiments, the anti-hooking ribs 90 can be evenly spaced apart along the entire width, or one or more section of the width, of the main body lower portion 28BL, while in other embodiments the anti-hooking ribs 90 can be unevenly spaced apart along the entire width, or one or more section of the width, of the main body lower portion 28BL. In various embodiments, the anti-hooking ribs 90 can be formed and spaced along the entire width of the main body lower portion 28BL, while in other embodiments the anti-hooking ribs 90 can be formed in one or more group disposed along one or more portion or section of width of the main body lower portion 28BL. Furthermore, in various embodiments anti-hooking ribs 90 have a consistent height S along their entire length, while in other embodiments the height S of the anti-hooking ribs 90 can increase and/or decrease, vary or undulate along their length. In various embodiments, the height(s) of S can be the same for each anti-hooking rib 90 (e.g., all anti-hooking ribs 90 have the same size, form, geometry and profile), while in other embodiments one or more of the anti-hooking ribs 90 has a size, form, geometry and/or profile than at least one other anti-hooking rib 90.

The anti-hooking ribs 90 are structured and operable to prevent the drive track 22 (e.g., the paddle and/or studs of the drive track 22) from hooking or catching on the lower distal end 94 of snow flap 28. Particularly, the height S of the anti-hooking ribs 92 is such the anti-hooking ribs protrude or extend from the underside of the main body lower portion 28BL a sufficient distance whereby, if operation of the snowmobile 10 causes the drive track 22 to contact the snow flap 28, or the snow flap 28 to contact the drive track 22, the drive track paddles and/or studs will contact the anti-hooking ribs 90, and not hook or catch the lower distal end 94 of the snow flap 28. Particularly, the anti-hooking ribs 90 are disposed longitudinally along the underside of the main body lower portion 28BL, and shaped and have a length such that the paddles and/or studs of the drive track 22 cannot catch or hook on the anti-hooking ribs 90, but rather will simple contact and slide or advance along the anti-hooking ribs 90 elongated top edges, thereby preventing the drive track paddles and/or studs from hooking or catching snow flap distal end 94, and thereby preventing damage to the snow flap 28 and/or the drive track 22.

Referring particularly to FIG. 11, is still further embodiments, the snow flap 28 can comprise a plurality of reinforcement braces 98 formed along an interior side of a longitudinal corners 102 formed at the junction of the main body central panel upper portion 74U and each of the sidewall upper portion 78U of the snow flap main body upper portion 28BU. Although FIG. 11 only exemplarily illustrates the reinforcement braces 98 disposed only the interior of one of the opposing longitudinal corners 102, it should be readily understood that the interior of both of the longitudinal corners 102 comprise the reinforcement braces 98 described herein. Each reinforcement brace 98 includes a first side 98A connected to or integrally formed with the sidewall upper portion 78U and a second side 98B connected to or integrally formed with the main body central panel upper portion 74U. A third side 98C of each reinforcement brace 98 extending between the first and second sides 98A and 98B can have any desired shape or profile. The reinforcement braces 98 are structured and operable to prevent the sidewall upper portion 78U from folding, bending, collapsing or concaving interiorly inward into the main body central panel upper portion 74U. Additionally, the reinforcement braces help the snow flap 28 keep its shape while allowing it to bend and flex.

Referring now to FIGS. 14 through 17, as described above the snowmobile 10 comprises the engine heat exchanger 24 that is disposed on the underside of the tunnel 18. More particularly, the engine heat exchanger 24 is disposed on the underside of the tunnel main panel 18A. Generally, the engine heat exchanger 24 is fluidly connected to the prime mover 34 (e.g., an internal combustion engine (ICE) and/or an electric motor) and is structured and operable to have prime mover cooling fluid flowing from the prime mover 34 circulate therethrough and return to the prime mover 34, thereby cooling the prime mover 34. Specifically, as hot cooling fluid from the prime mover 34 circulates through the engine heat exchanger 34 heat from the hot cooling fluid is absorbed by the heat exchanger 24 and the cool/cold environment surrounding the heat exchanger 24, thereby cooling the cooling fluid. The cooled cooling fluid is then returned to the prime mover 34, thereby cooling the prime mover 34. It should be noted that the heat exchanger 24 as shown in FIGS. 15 and 16 are only exemplary illustrations of exemplary configurations, shapes, and sized of the heat exchanger 24 and are not limiting. The heat exchanger 24 as described and exemplarily illustrated herein can have any desired configuration and shape (e.g., with or without an opening in the center portion thereof) and size (e.g., have different lengths and widths such that heat exchanger 24 can cover any desired portion (e.g., length and width) of the underside of the tunnel 18.

In various embodiments, the snowmobile 10, particularly the engine heat exchanger 24, includes one or more removable heat exchanger shield or guard 106 that is/are structured and operable to protect the heat exchanger 24 from being struck or contacted by the drive track 22 (e.g., the drive track paddles and/or studs) causing damage to the heat exchanger 24 and/or the tunnel 18. In various embodiments, the heat exchanger shield(s) 106 can be elongated C-channel structures that are structured and operable to slidingly engage with, and be retained by, exchanger shield retention guides 110 formed in the heat exchanger 24 at one or more location across the width of the heat exchanger 24. For example, in various embodiments legs 106A of the heat exchanger shield(s) 106 can have nodules, feet or any other suitable engagement structure 114 formed on distal ends thereof. Additionally, distal ends of the exchanger shield retention guides 110 can have fingers or lips 118 formed thereon that angle inward toward the space between adjacent shield retention guides 110. Therefore, the shield leg engagement structures 114 can be inserted between the exchanger shield retention guides 110 such that the exchanger retention guide fingers 118 retain the shield leg engagement structures 114 between adjacent shield retention guides 110. Particularly, the exchanger shield legs 106A can be inserted between adjacent exchanger shield retention guides 110 and the heat exchanger shield(s) 106 can be slid within the exchanger shield retention guides 110 along the length of the heat exchanger 24, whereby the shield leg engagement structures 114 slidingly engage the exchanger shield retention guide fingers 118 and retain the heat exchanger shield(s) 106 in place on the heat exchanger 24

As describe above, the taillight housing fixture 26 is mounted to the bumper/hand bar 48 and to the rearward distal end of the tunnel 18. When the taillight housing fixture 26 is so mounted, a rearward distal end of the heat exchanger 24 can be at least partially covered or concealed by at least a portion of the taillight housing fixture 26 when viewed from the rear of the tunnel 18 such that access from the rear end of the tunnel 18 to the heat exchanger retention guides 110 can be impeded or impaired due to the length of the heat exchanger shields 106 being greater than the distance between the rearward end of the heat exchanger 24 and the rearward end of the tunnel main panel 18A. However, in various embodiments, the taillight housing fixture 26 further comprises one or more heat exchanger shield access port or window 122 formed in a trailing edge 120 of the taillight housing flap mounting tail 26C (i.e., a trailing edge of the taillight housing fixture 26). The heat exchanger shield access port(s) 122 are structured and operable to allow access to the exchanger shield retention guides 110 of heat exchanger 24 such that the heat exchanger shield(s) 106 can be installed and removed without removing the taillight housing fixture 26. In various embodiments, the heat exchanger shield access port(s) 122 can be one or more elongated notch or recess formed in the trailing edge 120 of the taillight housing flap mounting tail 26C. Alternatively, the heat exchanger shield access port(s) 122 can be one or more hole, aperture, cutout, or void in the taillight housing flap mounting tail 26C that is structured and operable to allow easy access to the exchanger shield retention guides 110 of heat exchanger 24.

More specifically, the heat exchanger shield access port(s) 122 provide access to one or more section of the rearward distal end of the heat exchanger 24, and more particularly to the exchanger shield retention guides 110, without removing or unmounting the taillight housing fixture 26 from either of the bumper/hand bar 48 and the tunnel 18. Hence, the heat exchanger shield access port(s) 122 allow access to the exchanger shield retention guides such that the heat exchanger shield(s) 106 to be installed and removed from the heat exchanger 24 (i.e., easily slidingly inserted into and withdrawn from exchanger shield retention guides 110, via access ports 122) without unmounting the taillight housing fixture 26 from both the bumper/hand bar 48 and the tunnel 18. As described above, the snow flap 28 is mounted to the taillight housing fixture 26 via the flap mounting holes 68 in the flap mounting tail 26C of the taillight housing fixture 26 and the fastening orifices 70 in the mounting lip 28A of the flap 28. When the snow flap 28 is mounted to the taillight housing fixture 26, the heat exchanger shield access port(s) 122 in the taillight housing fixture 26 are covered, concealed and inaccessible. Hence, in order to install and/or remove the heat exchanger shield(s) 106 on and/or from the heat exchanger 24 only the fasteners fastening the snow flap 28 to the taillight housing fixture 26 need to be removed, whereby the snow flap can be removed to provide access to the heat exchanger shield access port(s) 122 easy access to the heat exchanger shield(s) 106 and/or the exchanger shield retention guides 106 of the heat exchanger 24.

Referring now to FIG. 18, in various embodiments an underside of the taillight housing fixture 26 can comprise a plurality of bracket mounting bosses 162 structured and operable to receive fasteners (not shown) (e.g., screws, bolts, rivets, etc.) through holes 164 in tunnel 18, whereby the fasteners are utilized to secure the tunnel 18 to the taillight housing fixture 26. In various embodiments, the mounting bosses 162 are structured and operable to receive the fasteners (not shown) (e.g., screws, bolts, rivets, etc.) through holes 164 in tunnel 18 to secure a heat exchanger shield (not shown) to the tunnel 18 and to the taillight housing fixture 26.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A taillight housing assembly for a snowmobile, said taillight housing assembly comprising:

a main body that is connectable to a drive track tunnel of a snowmobile; and a pair of opposing retention wings extending from opposing lateral ends of the main body that are structured and operable to mount to a bumper/hand bar of the snowmobile, the opposing retention wings having a C-like shape at a most lateral portion of the taillight housing assembly such that opposing retention wings are mateable with an inboard side, an outboard and a forward side of the bumper/hand bar, wherein the taillight housing assembly is mountable to the drive track tunnel and the bumper/hand bar such that the taillight housing assembly provides structural reinforcement to the drive track tunnel.

2. The assembly of claim 1, wherein the retention wings are structured to be contoured and shaped to mate with a shape and contour of an outer surface of the bumper/hand bar.

3. The assembly of claim 2, wherein the taillight housing main body comprises a rear lens face for mounting at least one of one or more lighting fixture and one or more reflective lens, and the taillight housing fixture further comprises a flap mounting tail extending from the rear lens face, the flap mounting tail structured and operable to have a snow flap mounted thereto.

4. The assembly of claim 3, wherein the flap mounting tail comprises at least one heat exchanger shield access port structured and operable to provide access to a heat exchanger of the snowmobile for installing and removing one or more heat exchanger shield of the snowmobile.

5. A taillight and snow flap assembly for a snowmobile, said assembly comprising:

a taillight housing assembly mountable to a bumper/hand bar and a drive track tunnel of a snowmobile such that the taillight housing assembly provides structural reinforcement to the drive track tunnel; and a snow flap mountable to a taillight housing assembly, the snow flap comprising a pair of opposing retention arms extending from ends of opposing sidewalls of the snow flap and structured and operable to mount to the bumper/hand bar at a most lateral portion of the snow flap.

6. The assembly of claim 5, wherein the taillight housing assembly comprises:

a main body that is connectable to the drive track tunnel; and a pair of opposing retention wings extending from opposing lateral ends of the taillight housing main body that are structured and operable to mount to the bumper/hand bar.

7. The assembly of claim 6, wherein the retention wings are structured to be contoured and shaped to mate with a shape and contour of an outer surface of the bumper/hand bar.

8. The assembly of claim 7, wherein the taillight housing main body comprises a rear lens face for mounting at least one of one or more lighting fixture and one or more reflective lens, and the taillight housing fixture further comprises a flap mounting tail extending from the rear lens face, the flap mounting tail structured and operable to have the snow flap mounted thereto.

9. The assembly of claim 8, wherein the flap mounting tail comprises at least one heat exchanger shield access port structured and operable to provide access to a heat exchanger of the snowmobile for installing and removing one or more heat exchanger shield of the snowmobile.

10. The assembly of claim 7, wherein the snow flap comprises a main body having a central panel and the opposing sidewalls extending from central panel, wherein the snow flap main body comprises an upper portion and lower portion extending at an angle from the upper portion thereby defining an elbow the snow flap main body.

11. The assembly of claim 10, wherein the opposing retention arms are structured to be contoured and shaped to mate with a shape and contour of an outer surface of the bumper/hand bar.

12. The assembly of claim 11, wherein the snow flap further comprises a plurality of support and guide ribs formed on an under side of the snow flap main body central panel and within the elbow, the support and guide ribs structured and operable to provide structural support of the snow flap along the elbow and to direct snow thrown up by a snowmobile drive track onto an underside of the drive track tunnel.

13. The assembly of claim 12, wherein the snow flap further comprises plurality of anti-hooking ribs formed on an underside of the snow flap along a distal end section of the snow flap main body lower portion, the anti-hooking ribs structured and operable to prevent the drive track from hooking on a lower distal end the snow flap.

14. A snow flap for a snowmobile, said snow flap comprising:

a main body; and a pair of opposing retention arms extending from ends of opposing sidewalls of the main body, the retention arms structured and operable to mount to a bumper/hand bar of a snowmobile at a most lateral portion of the bumper/hand bar.

15. The snow flap of claim 14 further comprising a mounting lip structured and operable to mount the snow flap to a taillight housing assembly of the snowmobile.

16. The snow flap of claim 14, wherein the main body comprises:

a central panel and the pair of opposing sidewalls extending from central panel, and an upper portion and lower portion extending at an angle from the upper portion thereby defining an elbow the main body.

17. The snow flap of claim 16, wherein the retention arms are structured to be contoured and shaped to mate with a shape and contour of an outer surface of the bumper/hand bar.

18. The snow flap of claim 17, wherein the snow flap further comprises a plurality of support and guide ribs formed on an under side of the main body central panel and within the elbow, the support and guide ribs structured and operable to provide structural support of the snow flap along the elbow and to direct snow thrown up by a snowmobile drive track onto an underside of a tunnel of the snowmobile drive track.

19. The snow flap of claim 18, wherein the snow flap further comprises plurality of anti-hooking ribs formed on an underside of the snow flap along a distal end section of the main body lower portion, the anti-hooking ribs structured and operable to prevent the snowmobile drive track from hooking on a lower distal end the snow flap.

* * * * *